(12) United States Patent
Hutchison

(10) Patent No.: US 9,808,882 B2
(45) Date of Patent: Nov. 7, 2017

(54) SYSTEM AND METHOD FOR CONTROLLING WIRE FEED SPEED

(71) Applicant: ILLINOIS TOOL WORKS INC., Glenview, IL (US)

(72) Inventor: Richard Martin Hutchison, Iola, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 420 days.

(21) Appl. No.: 14/314,981

(22) Filed: Jun. 25, 2014

(65) Prior Publication Data
US 2015/0375331 A1 Dec. 31, 2015

(51) Int. Cl.
| B23K 9/12 | (2006.01) |
| B23K 9/095 | (2006.01) |
| B23K 9/073 | (2006.01) |
| B23K 9/09 | (2006.01) |
| B23K 9/173 | (2006.01) |

(52) U.S. Cl.
CPC ............ *B23K 9/125* (2013.01); *B23K 9/0735* (2013.01); *B23K 9/09* (2013.01); *B23K 9/0956* (2013.01); *B23K 9/173* (2013.01)

(58) Field of Classification Search
CPC ........ B23K 9/09; B23K 9/173; B23K 9/0735; B23K 9/125; B23K 9/0956
USPC ... 219/76.12, 124.01, 124.02, 130.33, 130.1, 219/130.51, 137 PS, 137 R
See application file for complete search history.

(56) References Cited

U.S. PATENT DOCUMENTS

| 5,349,156 A | 9/1994 | Madigan | |
| 6,087,626 A | 7/2000 | Hutchison | |
| 6,248,976 B1* | 6/2001 | Blankenship | ........ B23K 9/0953 |
| | | | 219/130.21 |
| 6,326,591 B1 | 12/2001 | Hutchinson | |
| 6,653,595 B2 | 11/2003 | Hutchison | |
| 6,800,832 B2 | 10/2004 | Hutchison | |
| 6,933,466 B2 | 8/2005 | Hutchison | |
| 6,974,931 B2 | 12/2005 | Holverson | |
| 6,987,243 B2 | 1/2006 | Hutchison | |
| 6,995,338 B2 | 2/2006 | Hutchison | |
| 7,414,222 B2 | 8/2008 | Holverson | |
| 7,598,474 B2 | 10/2009 | Hutchison | |
| 8,316,462 B2 | 11/2012 | Becker | |
| 8,492,678 B2 | 7/2013 | Hutchison | |
| 2001/0047987 A1* | 12/2001 | Nowak | .................. B23K 9/124 |
| | | | 219/137.71 |

(Continued)

FOREIGN PATENT DOCUMENTS

WO 2006125234 11/2006

OTHER PUBLICATIONS

International Search Report from PCT application No. PCT/US2014/045873, dated Apr. 8, 2015, 12 pgs.

*Primary Examiner* — Thien S Tran
(74) *Attorney, Agent, or Firm* — Fletcher Yoder P.C.

(57) ABSTRACT

A method of controlling a welding system includes providing a welding wire to a welding torch at a first wire feed speed, providing a pulsed power output to the welding wire via a contact point of the welding torch, determining, utilizing a sensing system, a contact-point-to-work-distance (CPWD) between the contact point and a workpiece, and changing, utilizing a controller, the wire feed speed of the welding wire to a second wire feed speed based at least in part on the determined CPWD.

20 Claims, 12 Drawing Sheets

(56) References Cited

U.S. PATENT DOCUMENTS

| | | |
|---|---|---|
| 2004/0188404 A1 | 9/2004 | Hutchison |
| 2006/0163229 A1 | 7/2006 | Hutchison |
| 2008/0023457 A1 | 1/2008 | Holverson |
| 2010/0006552 A1 | 1/2010 | Hutchison |
| 2011/0006047 A1* | 1/2011 | Penrod ............... B23K 9/0956 219/137 R |
| 2014/0312020 A1 | 10/2014 | Daniel |
| 2015/0108096 A1* | 4/2015 | Daniel ............... B23K 9/044 219/76.12 |

* cited by examiner

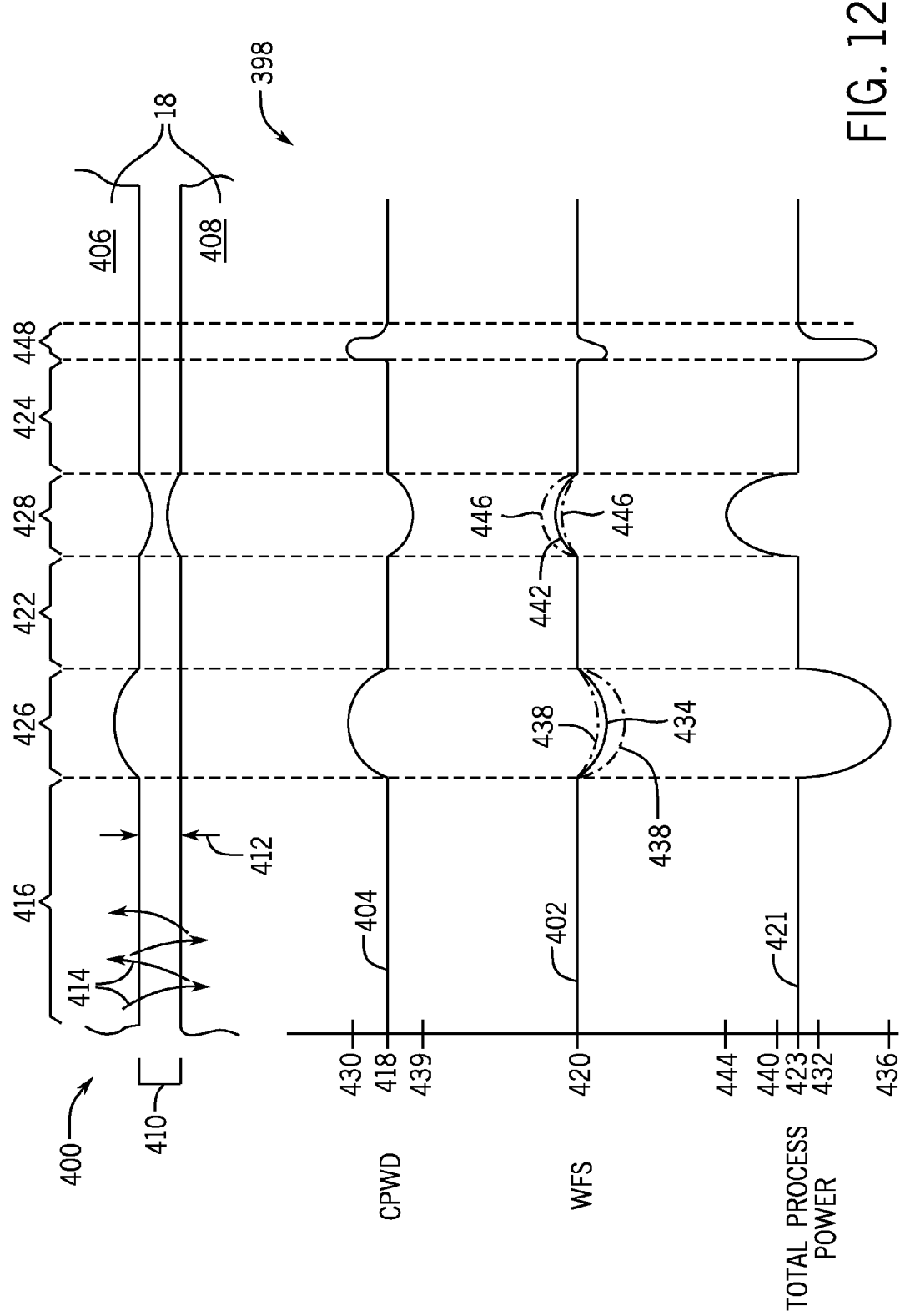

SYSTEM AND METHOD FOR CONTROLLING WIRE FEED SPEED

BACKGROUND

The present application relates generally to welding systems, and particularly to control of a welding system for gas-metal arc welding (GMAW), also known as metal inert gas (MIG) welding systems.

Arc welding systems generally comprise a power supply that applies electrical current to an electrode so as to pass an arc between the electrode and a workpiece, thereby heating the electrode and the workpiece to create a weld. In many systems, such as GMAW systems, the electrode consists of a wire which is advanced through a welding torch. As the electrode is heated by the arc, the electrode melts and is joined to molten metal of the workpiece to form the weld.

The feed speed of the wire through the welding torch affects the speed at which the user may form the weld. Increasing the current may enable greater wire feed speeds. Unfortunately, it may be difficult to adjust the wire feed speed during the formation of a weld. Controls on a torch to adjust the wire feed speed may increase torch complexity or may be cumbersome to operate during weld formation. Additionally, adjustments after a preset time interval or periodic adjustments of wire feed speed during the formation of a weld lack flexibility.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of controlling a welding system includes providing a welding wire to a welding torch at a first wire feed speed, providing a pulsed power output to the welding wire via a contact point of the welding torch, determining, utilizing a sensing system, a contact-point-to-work-distance (CPWD) between the contact point and a workpiece, and changing, utilizing a controller, the wire feed speed of the welding wire to a second wire feed speed based at least in part on the determined CPWD.

In another embodiment, a method of controlling a welding system includes providing a welding wire to a welding torch at a first wire feed speed, providing a pulsed power output to the welding wire via a contact point of the welding torch, determining, utilizing a sensing system, a contact-point-to-work-distance (CPWD) between the contact point and the workpiece, and changing, utilizing a controller, the wire feed speed of the welding wire from the first wire feed speed by a gain factor to a second wire feed speed based at least in part on the determined CPWD. Determining the CPWD includes determining an arc length based at least in part on the pulsed power output, determining a resistance of a power portion of the welding wire based at least in part on the power output, determining an electrode extension based at least in part on a functional relationship between the resistance and the electrode extension, and determining the CPWD based at least in part on a sum of the arc length and the electrode extension. The arc length includes a distance between an end of the welding wire and the workpiece. The powered portion includes a portion of the welding wire between the contact point and the end of the welding wire.

In another embodiment, a welding system includes a wire feeder coupled to a torch, a sensing system configured to determine a contact-point-to-work-distance (CPWD) between a contact point of the torch and a workpiece, and a controller coupled to the wire feeder. The torch includes a contact tip with the contact point. The controller is configured to control a wire feed speed (WFS) of the wire feeder based at least in part on the determined CPWD.

DRAWINGS

These and other features, aspects, and advantages of the present invention will become better understood when the following detailed description is read with reference to the accompanying drawings in which like characters represent like parts throughout the drawings, wherein:

FIG. 12 is an embodiment of a weld path and a corresponding chart illustrating adjustments to a wire feed speed (WFS) along the weld path.

DETAILED DESCRIPTION

Figure 1:
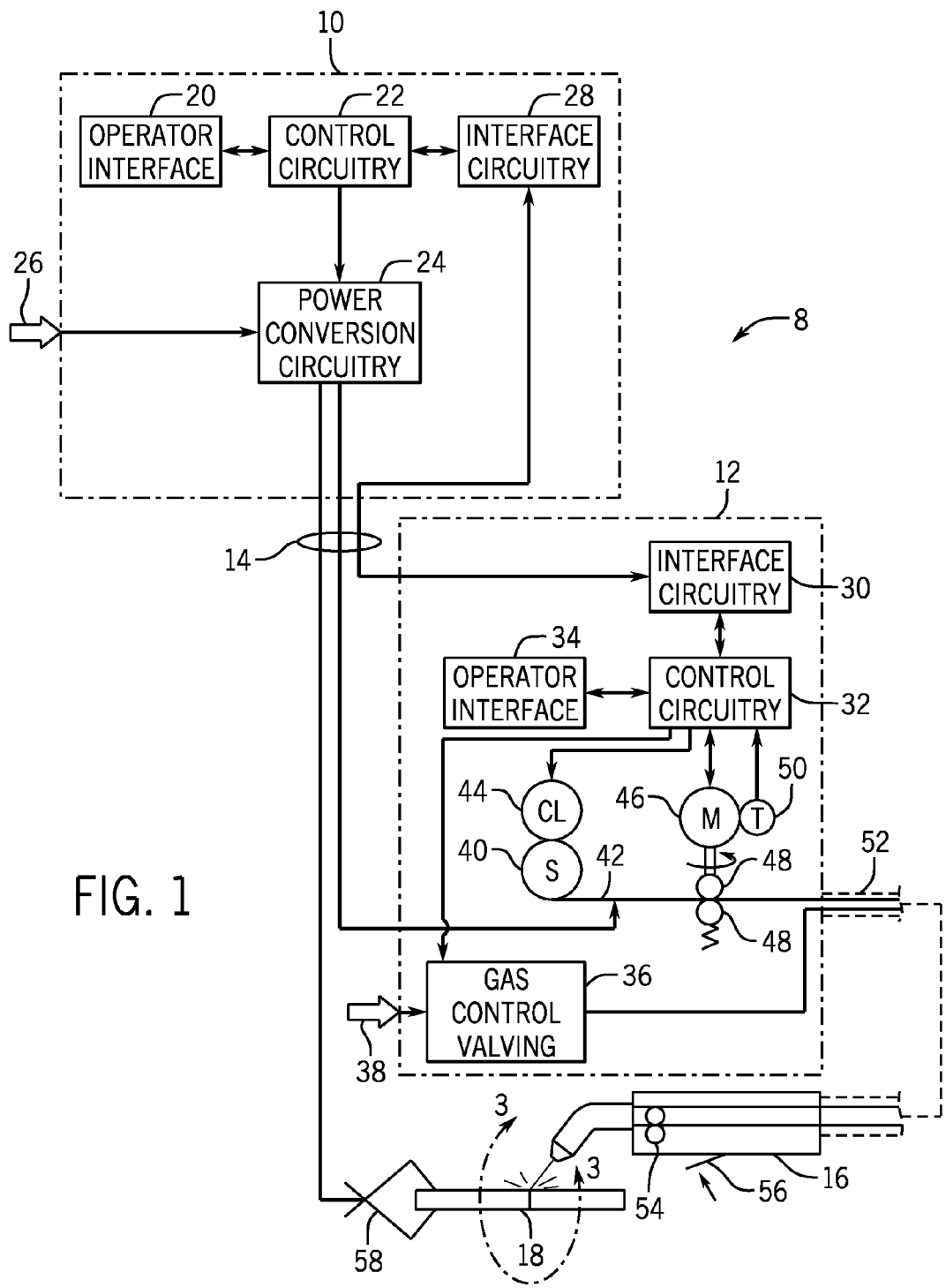
FIG. 1 is an embodiment of a gas-metal arc welding (GMAW) system illustrating a power supply coupled to a wire feeder for performing welding operations in accordance with aspects of the present techniques.

Embodiments of GMAW systems as described herein control the wire feed speed (WFS) through the torch based at least in part on the contact-point-to-work-distance (CPWD). The contact point may be within a contact tip of the welding torch, and the contact point transfers the welding output of the GMAW system to the welding wire. The CPWD may be determined via analysis of the weld voltage and arc voltage during the performance of a welding process (e.g., pulsed GMAW process). Additionally, or in the alternative, the CPWD may be determined via an optical sensing system (e.g., camera), an ultrasonic sensing system, a mechanical sensing system, or an inductive sensing system, or any combination thereof. Control of the WFS based on the CPWD may increase the user control of the total process power when utilized with a constant voltage (CV) GMAW system. The system may decrease the WFS by a gain factor based on an increase of the CPWD, thereby decreasing the total process power of the weld. Additionally, or in the alternative, the system may increase the WFS by a gain factor based on a decrease of the CPWD, thereby increasing the total process power of the weld. The WFS may be dynamically adjusted during weld formation, thereby enabling the user to adjust the total process power during weld formation without manual adjustments to the wire feeder or to the power source. Furthermore, the WFS may be dynamically adjusted based on the CPWD during weld formation without manual adjustment of controls on the torch. In some embodiments, the control of WFS based at least in part on the CPWD may increase the control of the penetration of the weld. The WFS may be controlled based at least in part on the CPWD in manual or automated GMAW systems.

In some embodiments, control circuitry of the GMAW system (e.g., pulsed GMAW system) may determine the arc length from sensed voltages and currents during a change to or from a pulse peak. The weld voltage supplied to the electrode has multiple components, such as voltage across the electrode, a fall voltage, and an arc voltage across the arc length. The arc voltage may be directly related to the arc length. The control circuitry utilizes changes in the observed weld current and the weld voltage (e.g., during a ramp up or ramp down of a pulse) with test data corresponding to various arc parameters to determine the arc voltage via subtracting the effects of the other components from the weld voltage. The control circuitry may determine the electrode resistance and electrode extension from the sensed voltage and current during the ramp up or ramp down portion of a pulse to determine the voltage across the electrode. Using the test data and observed weld current and weld voltage, the control circuitry may determine the fall voltage, the arc voltage, and the arc length. The control circuitry may compare the determined arc length to an arc length setting, and control the power supply and/or the wire feeder to adjust arc parameters that affect the arc length based at least in part on a difference between the determined arc length and the arc length setting. Accordingly, the control circuitry may determine arc length and control the arc length in a closed-loop control. Additionally, determination of the electrode extension and the arc length enables the control circuitry to determine the CPWD.

Turning now to the drawings, and referring first to FIG. 1, a welding system 8 is illustrated as including a power supply 10 and a wire feeder 12 coupled to one another via conductors or conduits 14. In the illustrated embodiment the power supply 10 is separate from the wire feeder 12, such that the wire feeder 12 may be positioned at some distance from the power supply 10 near a welding location. However, it should be understood that the wire feeder 12, in some implementations, may be integral with the power supply 10. In such cases, the conduits 14 would be internal to the system. In embodiments in which the wire feeder 12 is separate from the power supply 10, terminals are typically provided on the power supply 10 and on the wire feeder 12 to allow the conductors or conduits 14 to be coupled to the systems so as to allow for power and gas to be provided to the wire feeder 12 from the power supply 10, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor (e.g., clamp 58) is typically run to the welding workpiece 18 so as to complete an electrical circuit between the power supply 10 and the workpiece 18.

The system is designed to allow for data settings (e.g., weld parameters, arc length) to be selected by the operator, particularly via an operator interface 20 provided on the power supply 10. The operator interface 20 will typically be incorporated into a front faceplate of the power supply 10, and may allow for selection of settings. Weld parameters may include arc parameters and system parameters as discussed below. System parameters may include background and peak currents and voltages, pulse frequency, pulse period, and so forth. Arc parameters may include electrode size, type, and material, wire feed rate, shielding gas composition, and so forth. In particular, the welding system 8 is designed to allow for MIG welding with various alloys of steel, aluminum, or other welding wire that is channeled through the torch 16. These weld parameters are communicated to control circuitry 22 within the power supply 10. The system may be particularly adapted to implement welding regimes designed for certain electrode types, such as solid and/or cored electrodes.

The control circuitry 22, described in greater detail below, operates to control generation of welding power output from the power supply 10 that is applied to the welding wire for carrying out the desired welding operation. In certain presently contemplated embodiments, for example, the control circuitry 22 may be adapted to regulate a GMAW-P regime that maintains a substantially constant arc length between the end of the welding wire and the workpiece 18. For example, the control circuitry 22 may maintain the arc length within a threshold length of an arc length setting. The threshold length may be within approximately 1, 5, or 10 percent of the arc length setting. The control circuitry 22 may determine the arc length during a pulse waveform provided to the torch 16, and control the arc length during the same pulse waveform or a subsequent pulse waveform via a closed-loop control system. The control circuitry 22 may determine the arc length as described herein from sensed voltages and currents of the pulsed waveform without altering (e.g., inducing perturbations) the pulse waveform for measurement purposes. Moreover, in some embodiments, the control circuitry 22 may determine the arc length during a ramp up and prior to controlling the pulse waveform to a peak value. The control circuitry 22 may sense the voltage between the torch 16 and the workpiece 18, and determine the arc voltage and arc length based at least in part on one or more of a voltage change across the welding wire, a cathode fall voltage, and an anode fall voltage. In some embodiments, the control circuitry 22 may direct the power supply 10 to provide pulse waveforms to promote short circuit transfer of molten metal to a progressing weld puddle, while maintaining a substantially constant arc length during peak portions of the pulsed waveform.

In "short circuit" modes, droplets of molten material form on the welding wire under the influence of heating by the welding arc, and these are periodically transferred to the weld pool by contact or short circuits between the wire and droplets and the weld pool. "Pulsed welding" or "pulsed MIG welding" refers to techniques in which a pulsed power waveform is generated, such as to control deposition of droplets of metal into the progressing weld puddle. As discussed herein, the pulsed waveforms generated by power conversion circuitry 24 and controlled by the control circuitry 22 may be utilized for various GMAW transfer modes, including, but not limited to, short-circuit transfer (e.g., regulated metal deposition (RMD™)), globular transfer, spray transfer, and pulsed spray, or any combination thereof.

The control circuitry 22 is thus coupled to power conversion circuitry 24. This power conversion circuitry 24 is adapted to create the output power, such as pulsed waveforms that will ultimately be applied to the welding wire at the torch 16. Various power conversion components may be employed within the power conversion circuitry 24, including, but not limited to, choppers, boost circuitry, buck circuitry, inverters, converters, transformers, and so forth. The configuration of such power conversion circuitry 24 may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply 10 illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components 28, 30 and a multi-conductor cable run between the respective interface circuitry to allow for such information as wire feed speeds, processes, selected currents, voltages, arc lengths, or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply 10 via the interface circuitry 30. The control circuitry 32 is coupled to an operator interface 34 on the wire feeder 12 that allows selection of one or more weld parameters, particularly wire feed speed. The operator interface 34 may also allow for selection of such weld parameters as the process, the type of wire utilized, current, voltage, arc length, or power settings, and so forth. The control circuitry 32 is also coupled to gas control valving 36 which regulates the flow of shielding gas to the torch 16. In general, such gas is provided at the time of welding, and may be turned on immediately preceding the weld and/or for a short time following the weld. The gas supplied to the gas control valving 36 is typically provided in the form of pressurized bottles, as represented by reference numeral 38.

The wire feeder 12 includes components for feeding wire to the welding torch 16 and thereby to the welding application, under the control of control circuitry 36. For example, one or more spools 40 of welding wire are housed in the wire feeder 12. Welding wire 42 is unspooled from the spools 40 and is progressively fed to the torch 16. The spool 40 may be associated with a clutch 44 that disengages the spool 40 when wire 42 is to be fed to the torch 16. The clutch 44 may also be regulated to maintain a minimum friction level to avoid free spinning of the spool 40. A feed motor 46 is provided that engages with feed rollers 48 to push wire 42 from the wire feeder 12 towards the torch 16. In practice, one of the rollers 48 is mechanically coupled to the feed motor 46 and is rotated by the feed motor 46 to drive the wire 42 from the wire feeder 12, while the mating roller 48 is biased towards the wire 42 to maintain good contact between the two rollers 48 and the wire 42. Some systems may include multiple rollers 48 of this type. Finally, a tachometer 50 may be provided for detecting the speed of the motor 46, the rollers 48, or any other associated component so as to provide an indication of the actual wire feed speed. Signals from the tachometer 50 are fed back to the control circuitry 36, such as for calibration.

It should be noted that other system arrangements and input schemes may also be implemented. For example, the welding wire 42 may be fed from a bulk storage container (e.g., a drum) or from one or more spools 40 outside of the wire feeder 12. Similarly, the wire 42 may be fed from a "spool gun" in which the spool 40 is mounted on or near the welding torch 16. As noted herein, the wire feed speed settings may be input via the operator input 34 on the wire feeder 12 or on the operator interface 20 of the power supply 10, or both. In systems having wire feed speed adjustments on the welding torch 16, this may be the input used for the setting.

Power from the power supply 10 is applied to the wire 42, typically by means of a welding cable 52 in a conventional manner. Similarly, shielding gas is fed through the wire feeder 12 and the welding cable 52. During welding operations, the wire 42 is advanced through the welding cable jacket towards the torch 16. Within the torch 16, an additional pull motor 54 may be provided with an associated drive roller, particularly for aluminum alloy welding wires. A trigger switch 56 on the torch 16 provides a signal that is fed back to the wire feeder 12 and therefrom back to the power supply 10 to enable the welding process to be started and stopped by the operator. That is, upon depression of the trigger switch 56, gas flow is begun, wire 42 is advanced, power is applied to the welding cable 52 and through the torch 16 to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

Figure 2:
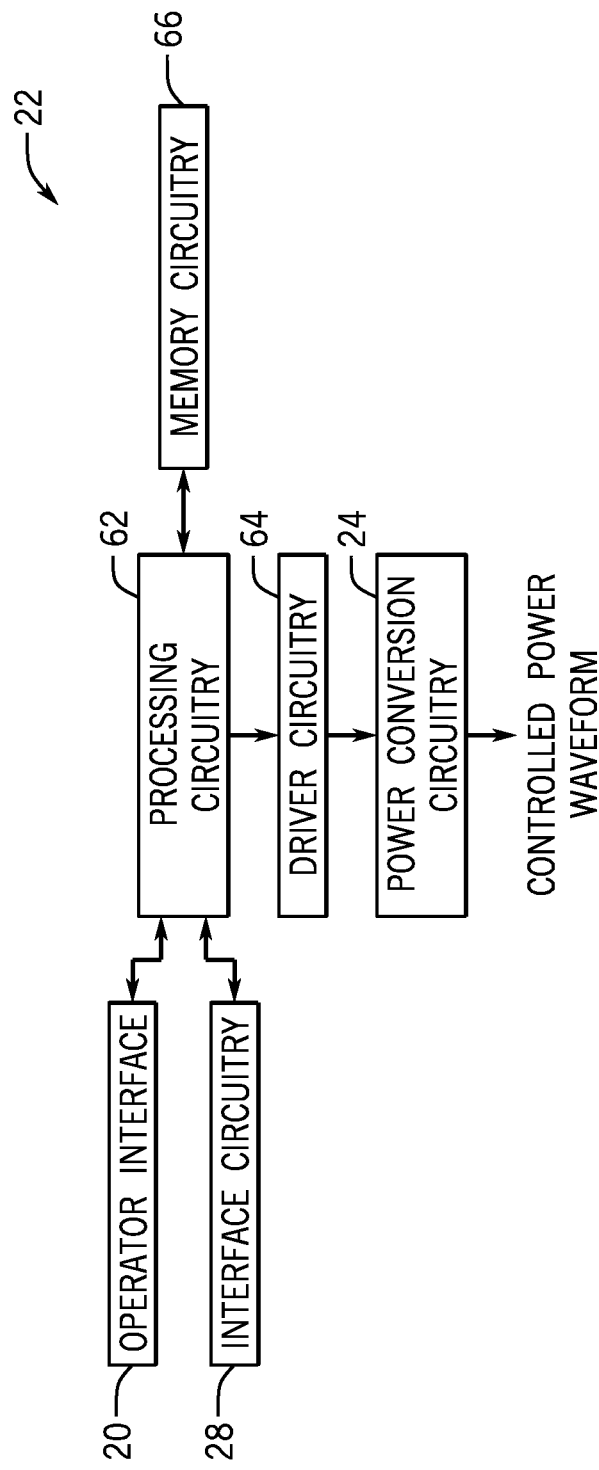
FIG. 2 is an embodiment of control circuitry components for a welding power supply of the type shown in FIG. 1.

FIG. 2 illustrates an exemplary embodiment for the control circuitry 22 designed to function in a system of the type illustrated in FIG. 1. The control circuitry 22 includes the operator interface 20 discussed above and interface circuitry 28 for communication of parameters to and from downstream components such as a wire feeder 12, a welding torch 16, and various sensors and/or actuators. The control circuitry 22 includes processing circuitry 62, which itself may comprise one or more application-specific or general purpose processors, designed to carry out welding regimes, make computations for waveforms implemented in welding regimes, and so forth. The processing circuitry 62 is associated with driver circuitry 64 which converts control signals from the processing to drive signals that are applied to power electronic switches of the power conversion circuitry 24. In general, the driver circuitry 64 reacts to such control signals from the processing circuitry 62 to allow the power conversion circuitry 24 to generate controlled waveforms for welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

Figure 3:
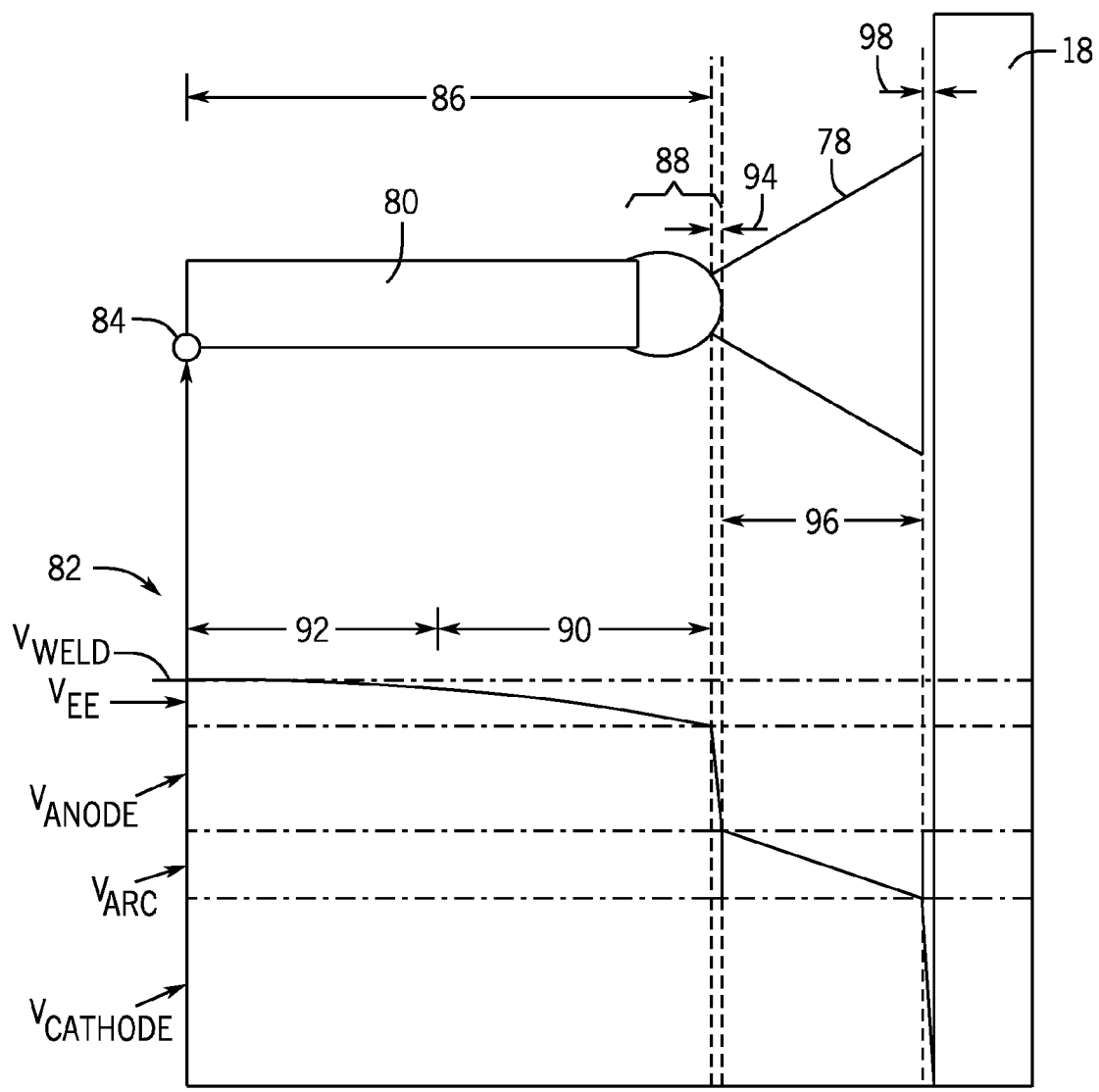
FIG. 3 is an embodiment of a welding arc between the electrode and workpiece, taken along line 3-3 of the GMAW system of FIG. 1.

FIG. 3 is an embodiment of a welding arc 78 between the electrode 80 and workpiece 18, taken along line 3-3 of the GMAW system of FIG. 1. A graph 82 illustrates the voltage between a contact point 84 in the torch 16 and the workpiece 18. As may be appreciated, the electrode 80 is an end of the welding wire 42 extending from the torch 16 that carries the pulsed waveform from the power supply 10. The torch 16 provides the pulsed waveform to the electrode 80 at the contact point 84 via a contact tip. In some embodiments, the contact tip includes a sensor coupled to the control circuitry 22 to provide current and/or voltage feedback. The pulsed waveform has a voltage component and a current component, and one or both components may be controlled by the power conversion circuitry 24 via the control circuitry 22. At the contact point 84, the pulsed waveform is applied to the electrode 80 with a weld voltage ($V_{weld}$) with respect to the workpiece 18. For example, during a peak portion of the pulsed waveform, $V_{weld}$ may be approximately a peak voltage set via the operator interface 20. During a background portion of the pulsed waveform, $V_{weld}$ may be approximately a background voltage set via the operator interface 20. The voltage across the electrode ($V_{EE}$) varies along the electrode 80 towards the workpiece 18 based at least in part on the resistance of the electrode 80, a length 86 (e.g., electrode extension) of the electrode 80 between the contact point 84 and an end 94 of the electrode 80, or a temperature of the electrode 80, or any combination thereof. In some embodiments, $V_{EE}$ changes in an approximately linear relationship with the length 86. In some embodiments, as shown in FIG. 3, $V_{EE}$ decreases more in a first portion 90 proximate to an end portion 88 than a second portion 92 proximate to the contact point 84. For example, the first portion 90 of the electrode 80 may be warmer and have a greater resistance than the second portion 92.

During the welding process, the end 94 of the end portion 88 may be herein characterized as an anode. In some embodiments, the end 94 is less than approximately 5, 10, 20, or 50 microns across. An anode voltage ($V_{anode}$) may be based at least in part on the type of electrode 80 (e.g., solid, cored), the electrode material, diameter of the electrode 80, electrode feed rate, or shielding gas, or any combination thereof. In some embodiments, $V_{anode}$ may be substantially independent with respect to the weld current through the end 94. The arc 78 extends across an arc length 96 (e.g., $l_{arc}$) between the end 94 and a surface region 98 of the workpiece 18. The surface region 98 may be herein characterized as a cathode. In some embodiments, the surface region 98 is less than approximately 5, 10, 20, or 50 microns across. A cathode voltage ($V_{cathode}$) may be based at least in part on the material of the workpiece 18, the type of joint, the electrode feed rate, or shielding gas, or any combination thereof. In some embodiments, $V_{cathode}$ may be substantially independent with respect to the weld current through the surface region 98. $V_{anode}$ and $V_{cathode}$ together may be referred to as fall voltage ($V_{fall}$) herein, and each may be substantially independent with respect to the weld current.

As shown in FIG. 3, the weld voltage $V_{weld}$ includes multiple components as shown in Equation (1):

$$V_{weld}=V_{EE}+V_{anode}+V_{arc}+V_{cathode} \quad \text{Equation (1)}$$

In some embodiments, $V_{arc}$ is less than approximately 10, 15, 20, or 25 percent of $V_{weld}$. For example, in an embodiment with a 0.045 inch mild steel electrode fed at 400 inches per minute, a 90-10 Argon-$CO_2$ shielding gas mixture, 0.75 inches electrode extension, and 0.2 inch arc length during a peak pulse, $V_{weld}$=32 V, $V_{EE}$=9 V, $V_{fall}$=18 V, and $V_{arc}$=5 V. The arc length 96 ($l_{arc}$) may be directly related to the arc voltage ($V_{arc}$) across the $l_{arc}$ 96. Presently contemplated embodiments of the control circuitry 22 may determine $V_{arc}$ during a pulsed waveform, and utilize the determined $V_{arc}$ to control $V_{weld}$ and adjust $l_{arc}$ 96 via adjustments to the pulsed waveform. In some embodiments, the control circuitry 22 determines $V_{arc}$ dynamically during the pulsed welding operation for control of the arc length 96 ($l_{arc}$) of present and/or subsequent pulsed waveforms.

Figure 4:
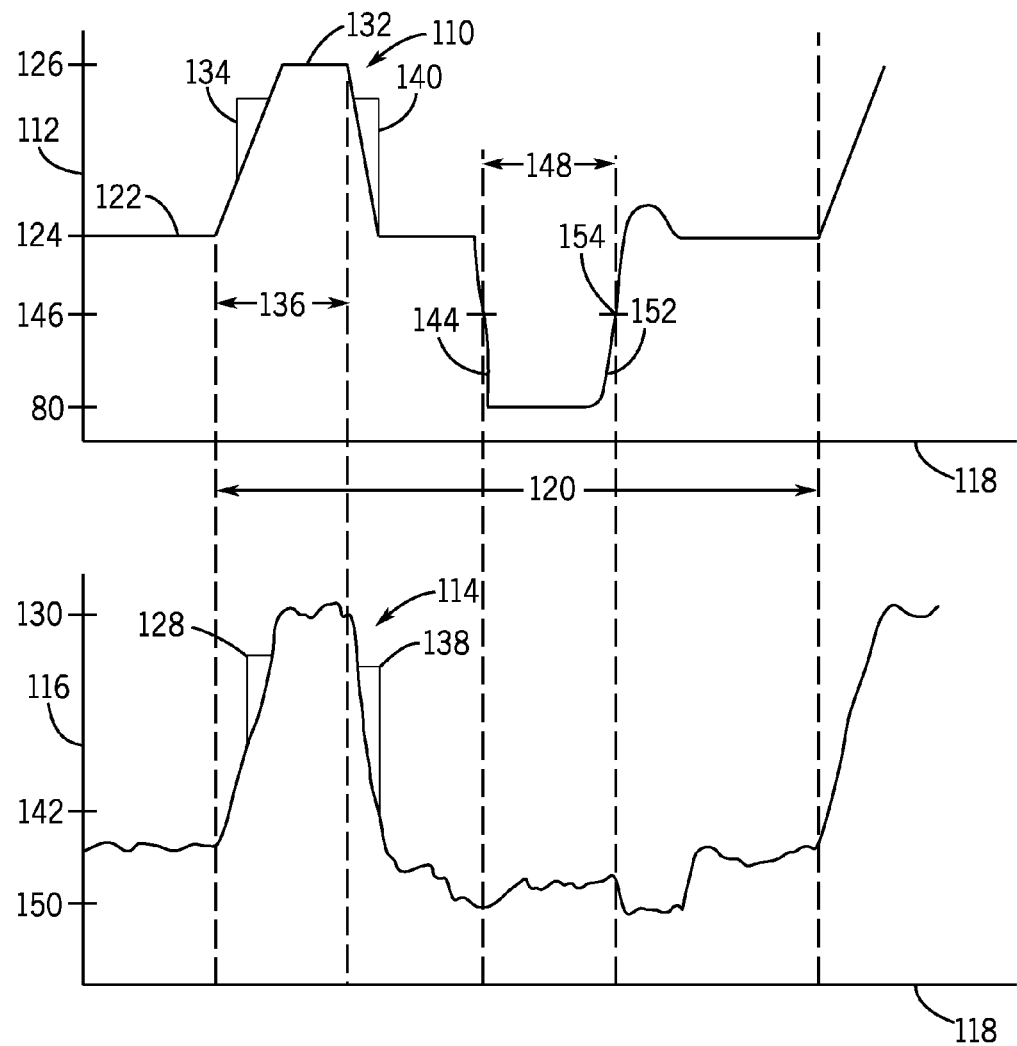
FIG. 4 is an embodiment of a voltage and current waveform of a GMAW system.

FIG. 4 illustrates an exemplary voltage waveform 110 with voltage axis 112 and current waveform 114 with current axis 116, both across time axis 118, as implemented by control circuitry 22 of the power supply 10. The control circuitry 22 controls the power conversion circuitry 24 to supply the voltage and current waveforms 110, 114 to the electrode 80 at the contact point 84. The voltage waveform 110 may include segments of constant voltage, while current waveform 114 may include segments which allow the weld current to vary during corresponding constant voltage segments and segments which ramp current up or down at substantially constant rates as controlled by the power conversion circuitry 24. The pulsed waveforms may repeat at a predetermined or set frequency with a period 120.

Referring to voltage waveform 110, first constant voltage segment 122 represents a first background phase, during which background voltage level 124 is held constant. On current waveform 114, the corresponding weld current during the first background phase is allowed to vary so as to maintain the background voltage level 124. In the exemplary voltage waveform 110, background voltage level 124 is low enough such that short circuits may not occur during the first constant voltage segment 122, and is high enough to preheat the end portion 88 of the electrode 80 to form a molten ball of electrode material before the voltage increase of a subsequent pulse. Accordingly, in various embodiments the background voltage level 124 ranges from approximately 17V to 20V, but depending on variables such as frequency, wire feed speed (WFS), peak voltage level 126, choice of electrode 80, etc., the background voltage 124 may be higher or lower.

Immediately following the first constant voltage segment 122, the first background phase ends and a peak phase 136 begins. The power conversion circuitry 24 increases the weld current at a peak current ramp up rate 128 to a peak current level 130. Once the weld current reaches the peak current level 130, the power conversion circuitry 24 increases the voltage to reach peak voltage level 126 during segment 132, rising at a voltage ramp up rate 134. The voltage ramp up rate 134 may not be commanded, but rather results from the commanded peak current ramp up rate 128 of the current waveform 114 and the resistance of the electrode 80. The voltage may remain at peak voltage level 126 until the peak phase 136 expires. During segment 132, the weld current 114 may fluctuate while the voltage 110 remains constant until the peak phase 136 expires. The peak voltage level 126, the peak phase 136, the peak current ramp up rate 128, and the initial peak current level 130 may be chosen so as to control $l_{arc}$ 96 and $V_{arc}$ while substantially initializing the transfer of molten electrode material toward the weld puddle.

A second background phase begins immediately after the peak phase 136 expires. The weld current 114 decreases at a current ramp down rate 138, causing a reduction in the voltage waveform 110 at a voltage ramp down rate 140 until a background weld current level 142 is reached. To maximize the precision of the voltage and weld current pulse, the current ramp down rate 138 may be significantly faster than the peak current ramp up rate 128. In one embodiment, current ramp down rate 138 is 2000 A/ms, double the peak current ramp up rate 128 of 1000 A/ms. As during the first background phase, the voltage is then maintained at background voltage level 124 while the weld current varies for the duration of the second background phase.

The molten electrode material may reach the weld puddle while still attached to the end of electrode 80, causing a short circuit and briefly extinguishing the arc 78. The short circuit may be detected at the point that voltage drop 144 crosses threshold voltage 146, triggering the end of the second background phase and the beginning of the restrike phase 148. During the restrike phase 148, current may be temporarily held constant at approximately a restrike current level 150 to allow the short circuit to clear. The restrike current level 150 may be high enough to keep the molten electrode material substantially fluid while it transfers to the weld puddle. It should be noted that as the molten electrode material detaches from the end portion 88 of the electrode 80 and the short circuit begins to clear, a voltage increase 152 naturally occurs; the arc restrike 154 occurs approximately at the point the voltage crosses the threshold voltage 146 and the control circuitry 22 detects that the short circuit has cleared. The control circuitry 22 may control the weld current 114 to approximately the background current level 142, and may control the voltage 110 to approximately the background voltage level 124 until the end of the period 120.

The control circuitry 22 controls the arc length 96 ($l_{arc}$) during a pulsed waveform as shown in FIG. 4 based at least in part on calculations from measurements of the pulsed waveform (e.g., the voltage waveform 110 and the weld current waveform 114). For times t during the pulsed waveform, the weld voltage ($V_{weld}$) may be determined from Equation (2):

$$V_{weld}(I(t)) = R_{EE} * I(t) + (V_{anode} + V_{arc} + V_{cathode}) \quad \text{Equation (2)}$$

where $R_{EE}$ is the resistance of the electrode 80. $V_{weld}(I(t))$ and $I(t)$ may be known values to the control circuitry 22 via direct measurement from sensors and/or control of the power conversion circuitry 24.

As discussed above, the $V_{arc}$ may be directly related to (e.g., a function of) the arc length 96 (e.g., $V_{arc} = V_{arc}(l_{arc})$). Accordingly, Equation 2 may be rewritten as Equation (3):

$$V_{weld}((t)) = R_{EE} * I(t) + \lambda \quad \text{Equation (3)}$$

where $\lambda$ is defined by Equation (4):

$$\lambda = V_{fall} + V_{arc}(l_{arc}) \quad \text{Equation (4)}$$

Figure 5:
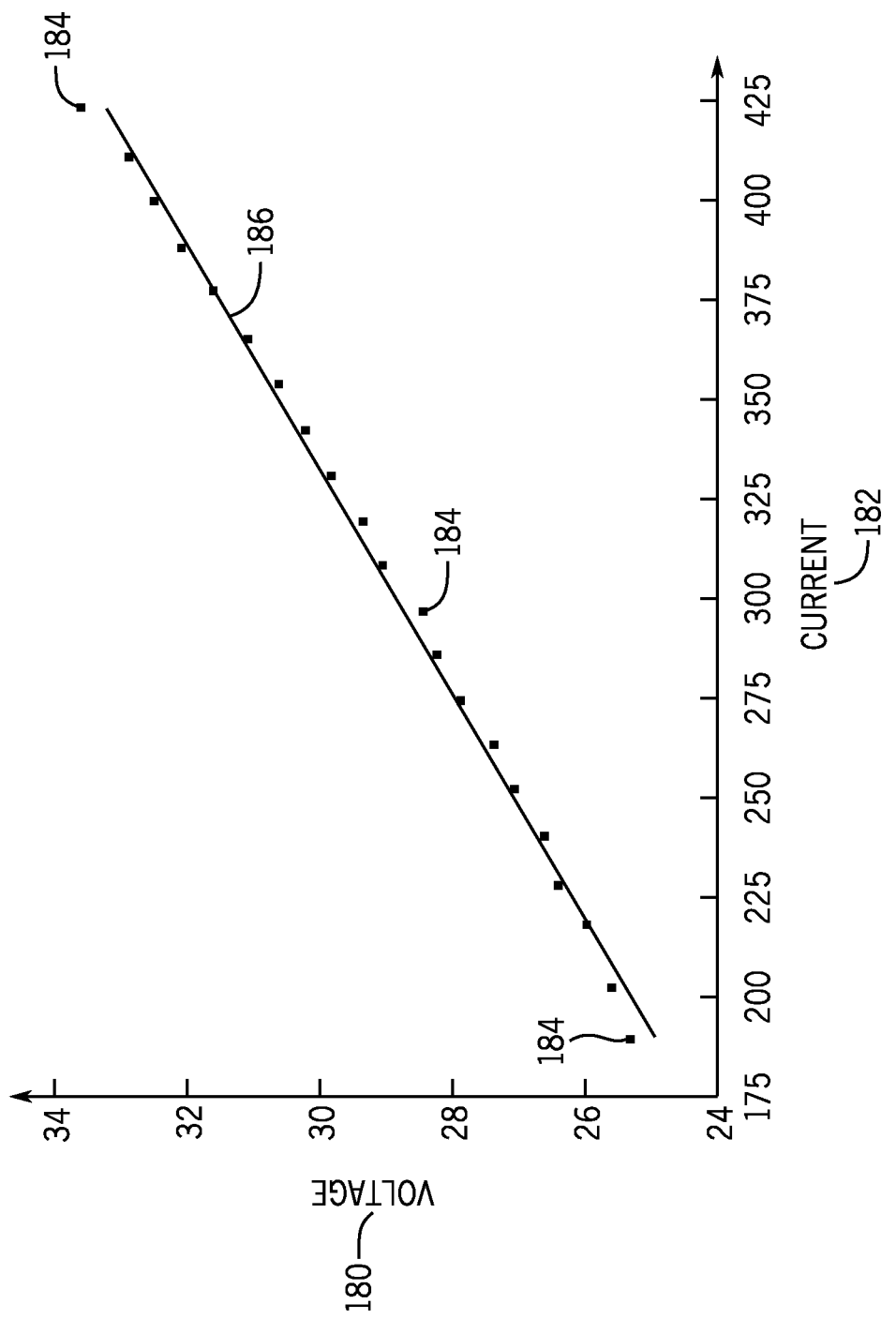
FIG. 5 is a graphical representation of sampled voltages and currents of a changing portion of a pulse waveform of a GMAW system.

The weld voltage and the weld current during the ramp up of the peak phase 136 or the ramp down from the peak phase 136 may be utilized to determine the electrode resistance $R_{EE}$. As shown in FIG. 5, the control circuitry 22 may sample the weld current 182 and corresponding weld voltage 180 when the pulsed waveform changes (e.g., during a ramp up to the peak phase 136 or ramp down from the peak phase 136). In other embodiments, the control circuitry 22 may sample only two points 184 of the current 180 and the corresponding voltages 182. Utilizing the point-slope formula, the control circuitry 22 may determine $R_{EE}$ from Equation (5):

$$R_{EE} = (V_2 - V_1)/(I_2 - I_1) \quad \text{Equation (5)}$$

where $I_1$ and $V_1$ are first values of a weld current and a corresponding voltage during the ramp up to the peak current and voltage levels (e.g., levels 130 and 126 respectively), and $I_2$ and $V_2$ are second values of a weld current and a corresponding voltage during the ramp up to the peak current and voltage levels. In some embodiments, $I_1$ and $V_1$ are first values of a current and a corresponding voltage during the ramp down from the peak current and voltage levels, and $I_2$ and $V_2$ are second values of a weld current and a corresponding voltage during the ramp down from the peak current and voltage levels. In some embodiments, the first and second values may be sampled points 184 or interpolated values between sampled points 184.

In some embodiments, the control circuitry 22 may sample three or more points 184 of the current 180 and the corresponding voltages 182, as shown in FIG. 5. The control circuitry 22 may determine a regression line 186 or other approximation that provides a functional relationship between multiple sampled weld current values and corresponding voltage values. The control circuitry 22 may utilize the functional relationship to determine $R_{EE}$. For example, FIG. 5 illustrates the weld current 180 and the voltage 182 during the ramp up of the peak phase in an embodiment with a 0.045 inch mild steel electrode fed at 300 inches per minute, with a 0.8 inch contact-point-to-work-distance (CPWD). The corresponding regression line 186 in this example may be defined by Equation (6):

$$V_{weld} = 18.27 \text{ V} + 0.03521 * I_{weld} \quad \text{Equation (6)}$$

where $R_{EE}$ is determined to be 0.03521Ω. Utilizing Equations (3) and $R_{EE}$ determined from Equation (5) or the functional relationship (e.g., Equation (6)), the control circuitry 22 may determine a value for as shown in Equation (7):

$$\lambda = V_1 - R_{EE} * I_1 \quad \text{Equation (7)}$$

Figure 6:
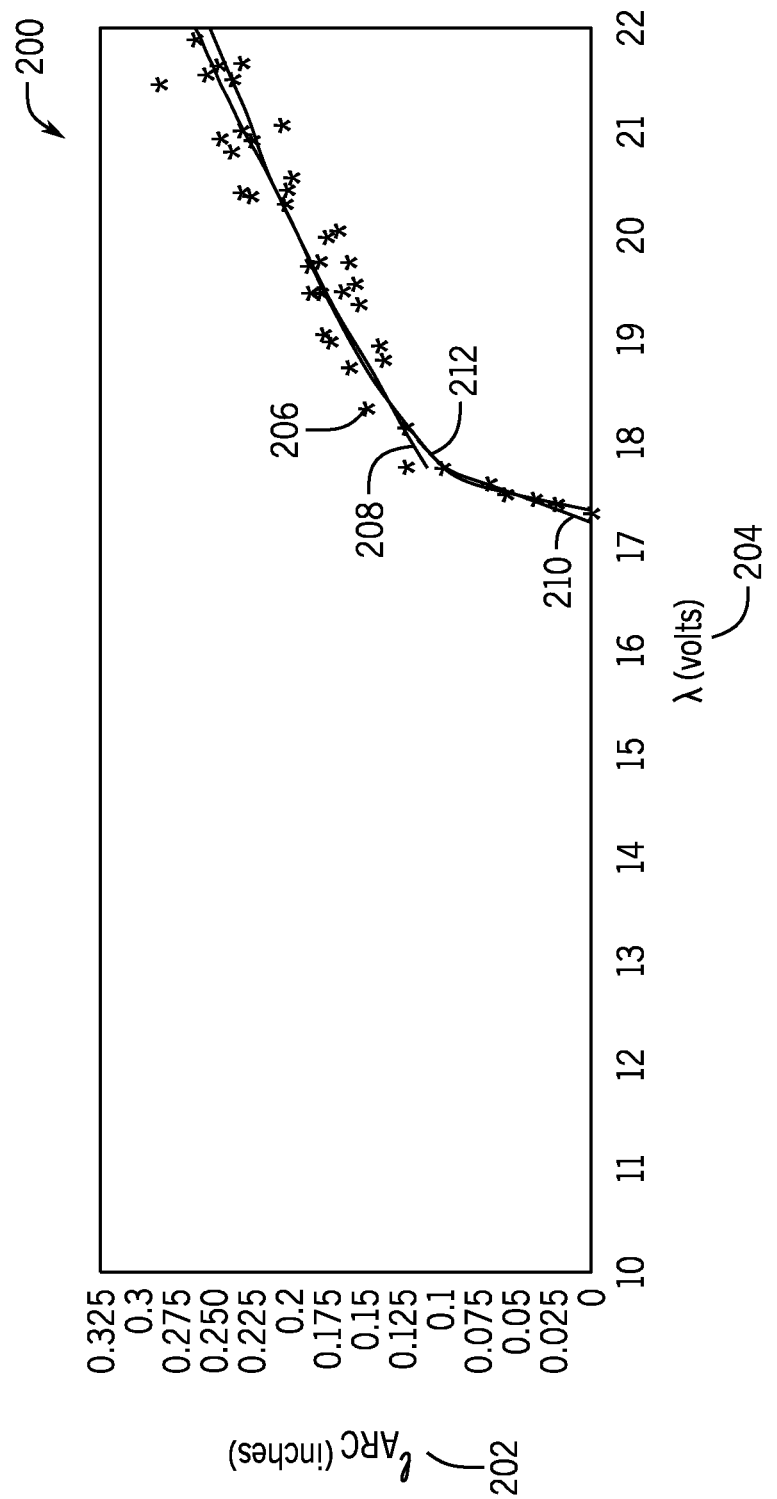
FIG. 6 is a graphical representation of a relationship between arc length and $\lambda$, in accordance with an embodiment.

The control circuitry 22 determines the arc length ($l_{arc}$) from based at least arc, in part on data loaded from memory circuitry 66. The memory circuitry 66 may include a database with data populated from one or more tests and calibrations that provide corresponding relationships between $\lambda$ and $l_{arc}$ for various combinations of the arc parameters. As discussed herein, arc parameters may include, but are not limited to, electrode type, electrode material, electrode size, electrode extension, wire feed rates, shielding gas composition, torch type, CPWD, pulse frequency, and so forth. A chart 200 of FIG. 6 illustrates arc length ($l_{arc}$) 202 corresponding to $\lambda$ values 204 for various combinations of arc parameters. For each chart or set of data points 206, the arc parameters may be divided into control arc parameters, which are maintained substantially constant for a data set, and variable arc parameters, which are adjusted for the data set. For example, chart 200 of FIG. 6 illustrates data points 206 from a sample set in which the control arc parameters are the electrode type, electrode material, electrode size, and shielding gas, and variable arc parameters include one or both of the electrode extension and the wire feed speed. In some embodiments, the data points 206 are obtained through visual measurement (e.g., via video) of the arc length 202 during test or calibration welds in which the variable arc parameters are adjusted. As may be appreciated, the visual measurements of the arc length 202 correspond to $\lambda$ values 204, and the values 204 may be determined as discussed above with FIG. 5 and Equations (3) through (7).

The values for arc length ($l_{arc}$) 202 and 204 for a set of arc parameters (e.g., control arc parameters, variable arc parameters) may have a functional relationship. In some embodiments, the functional relationship may be a piece-wise relationship in which a first portion of the data points 206 may be modeled with a first function, and a second portion of the data points 206 may be modeled with a different second function. For example, the data points 206 corresponding to arc lengths ($l_{arc}$) 202 greater than approximately 0.1 inch may be modeled with a first regression model 208, and the data points 206 corresponding to arc lengths ($l_{arc}$)

202 less than approximately 0.1 inch may be modeled with a second regression model 210. Two or more functional relationships may be utilized to model the relationship for a set of data points 206. Moreover, as may be appreciated, models for each of the piece-wise relationships may include, but are not limited to a linear model, a polynomial model, a logarithmic model, and an exponential model. In some embodiments, the functional relationship for all the data points 206 of a set may be modeled with a polynomial model 212 (e.g., third order, fourth order, or fifth order, or more) or via interpolation between tabular data points.

The chart 200 may be used to determine the components of λ 204 (e.g., $V_{fall}$ and $V_{arc}$) for the set of control arc parameters. $V_{arc}$ is directly related to $l_{arc}$ such that when $l_{arc}$ is approximately equal to zero inches, $V_{arc}$ is approximately equal to zero volts. Accordingly, utilizing Equation (4) and the chart 200 and/or functional relationship, $V_{fall}$ may be approximated as the voltage value 204 where the $l_{arc}$ value 202 is approximately equal to zero (e.g., the intercept of $l_{arc}$ and the voltage value 204). $V_{fall}$ may be substantially constant over the set of data points 206 with the maintained control arc parameters and adjusted variable arc parameters, thereby enabling the determination of $V_{arc}$, and thus the determination of $l_{arc}$ for the set of arc parameters.

The memory circuitry 66 may include the data of multiple charts 200 for various data sets and combinations of arc parameters. In some embodiments, the control circuitry 22 may utilize one or more data sets to estimate (e.g., via interpolation) $V_{fall}$, $V_{arc}$, and $l_{arc}$. For example, data sets corresponding to control arc parameters with an electrode size (e.g., 0.045 inch diameter) with a shielding gas composition (e.g., 90% argon, 15% $CO_2$) may be utilized to estimate $V_{fall}$, $V_{arc}$, and $l_{arc}$ for control arc parameters with a differently sized electrode (e.g., 0.05 inch diameter) and/or a different shielding gas composition (e.g., 85% argon, 15% $CO_2$). Testing or calibration data utilized to determine $V_{fall}$, $V_{arc}$, and $l_{arc}$ may be manually input to the memory circuitry 66 (e.g., via operator interface 20), or loaded via an input/output device (e.g., network, external memory).

Figure 7:
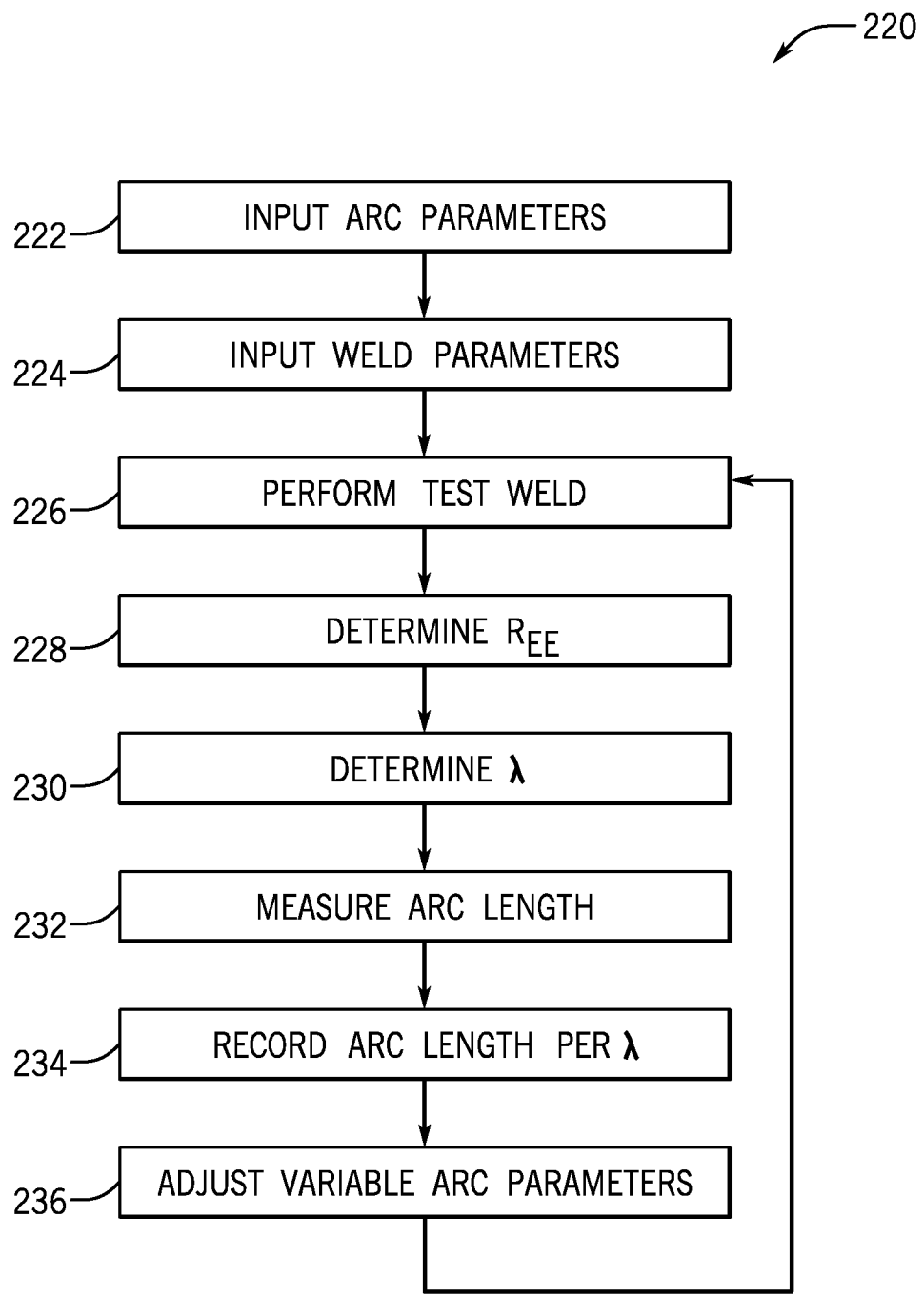
FIG. 7 is a flow chart illustrating a method to obtain a data set relating arc length and $\lambda$, in accordance with an embodiment.

FIG. 7 illustrates a flow chart describing a method 220 to obtain data points 206 for a data set or chart 200 to store in memory circuitry 66. At the beginning of the method 220, the operator inputs (block 222) arc parameters into an operator interface. In some embodiments, the inputs may be received at the power supply or a separate testing controller (e.g., test terminal) coupled to the power supply. The arc parameters may include control arc parameters that are substantially maintained during a data set, and variable arc parameters that are adjusted for various welds of the data set. For example, the control arc parameters may include, but are not limited to, the electrode type (e.g., solid, cored, hollow), the electrode material (e.g., steel, aluminum), the electrode geometry (e.g., diameter), the shielding gas composition (e.g., argon, $CO_2$, hydrogen, oxygen), and workpiece parameters (e.g., workpiece materials, joint type). The variable arc parameters may include, but are not limited to, the wire feed rate, the electrode extension, the CPWD, and the shielding gas supply rate. The operator inputs (block 224) system parameters regarding the supplied pulsed waveform into the operator interface, such as via the power supply operator interface. The system parameters may include, but are not limited to the background and peak currents and voltages, the pulse frequency, the peak pulse duration, and so forth.

After the arc and system parameters for the data set are input, the operator may perform (block 226) a test weld. The test weld may include one or more pulsed waveforms that deposit one or more droplets to a weld pool. During the test weld, the control circuitry monitors the weld current and the weld voltage while the weld current and the weld voltage are changing (e.g., ramp up, ramp down). The control circuitry determines (block 228) $R_{EE}$ based at least in part on a regression model of the observed weld current and weld voltage or the point-slope formula with the observed weld current and weld voltage, as discussed above. $R_{EE}$ may be determined from observed increasing or decreasing weld current and weld voltage values. Utilizing $R_{EE}$, the observed weld current and weld voltage, and Equation (3), the control circuitry determines (block 230) the sum of $V_{fall}$ and $V_{arc}$ as a value of λ. The arc length ($l_{arc}$) of the test weld is measured (block 232), such as via a high speed video. In some embodiments, video of the test weld is later processed with the observed weld current and weld voltage, and the arc length is measured after completion of the test weld. Once the arc length is measured, $l_{arc}$ and corresponding are recorded (block 234) as a data point 206 in the data set. In some embodiments, the operator adjusts (block 236) one or more of the variable arc parameters prior to returning to block 226 to perform the next test weld. Additionally, or in the alternative, the control circuitry or test controller (e.g., computer) coupled to the power supply may adjust the variable arc parameters based at least in part on a set of instructions to obtain a desired data set of arc lengths for various values of λ without stopping the test weld. In other words, the control circuitry may execute data set acquisition instructions to automatically adjust the variable arc parameters to populate a data set. As may be appreciated, the steps in blocks 228, 230, 232, and 234 may be performed by the control circuitry of the power supply and/or a test controller. In some embodiments, method 220 may be performed for multiple combinations of arc parameters to populate a database that may be loaded into memory circuitry 66 prior to use at a work site.

Figure 8:
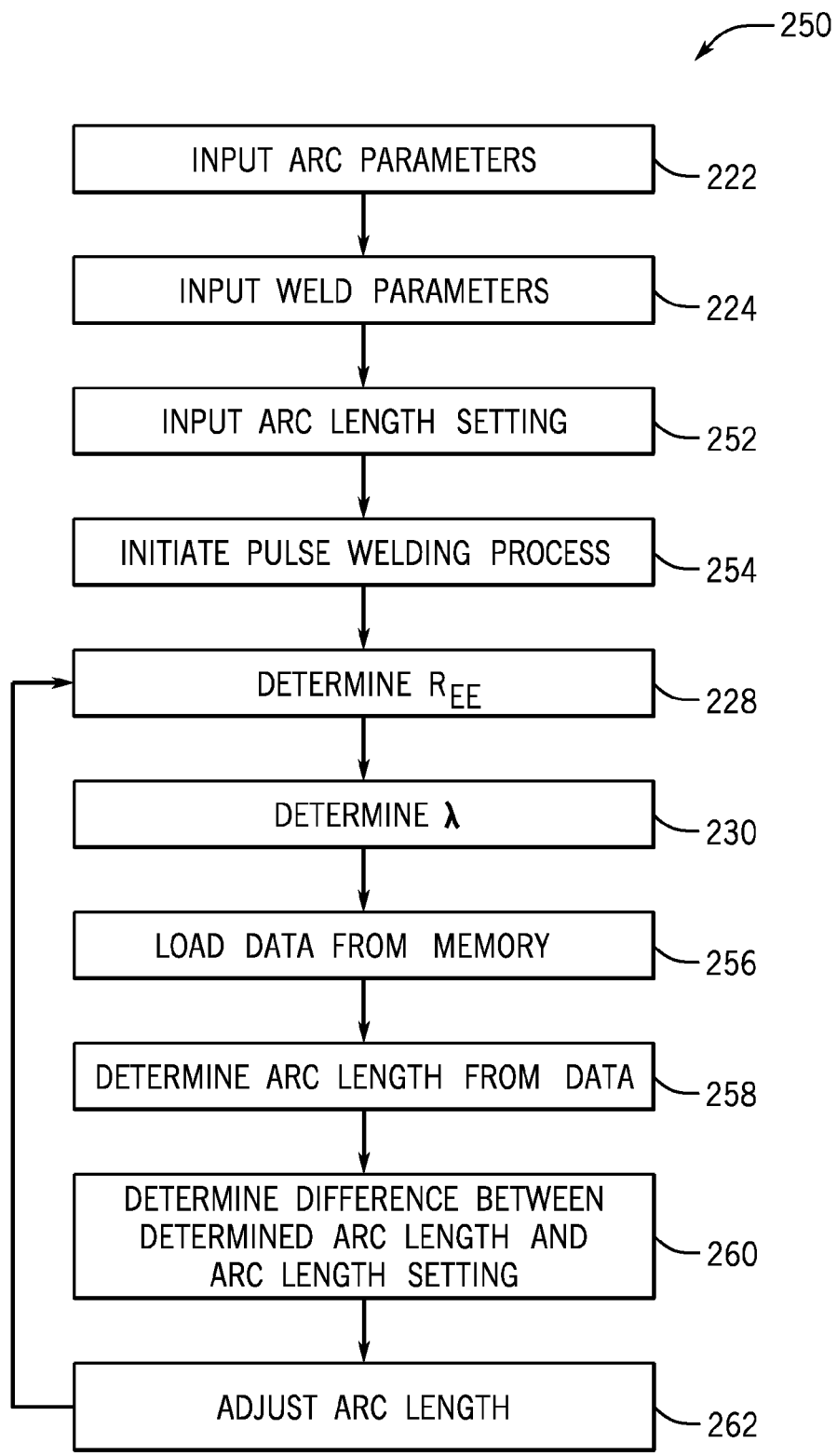
FIG. 8 is a flow chart illustrating a method to determine and control arc length of a pulse waveform.

FIG. 8 illustrates a method 250 of utilizing the data to determine and control arc length during a GMAW process (e.g., short circuit, globular, spray, pulse). The operator inputs (block 222) arc parameters and inputs (block 224) system parameters into an operator interface of the power supply and/or the wire feeder. The operator also inputs (block 252) an arc length setting to the operator interface. As may be appreciated, the arc length may be associated with the heat input to the electrode and the workpiece, as well as the weld quality and transfer of the electrode to the workpiece. The operator may initiate (block 254) the welding process that supplies pulsed waveforms to the torch.

Similar to method 220 discussed above, the control circuitry monitors the weld current and the weld voltage for changes (e.g., increases or decreases) to the power supplied during the welding process. The control circuitry determines (block 228) $R_{EE}$ based at least in part on a regression model of the observed weld current and weld voltage or the point-slope formula with the observed weld current and weld voltage during the changes (e.g., ramp up or ramp down). Utilizing $R_{EE}$, the observed weld current and weld voltage during the change, and Equation (3), the control circuitry determines (block 230) the sum of $V_{fall}$ and $V_{arc}$ as a value of 2. The control circuitry loads (block 256) data from the memory circuitry that relates to the input arc parameters and input system parameters. In some embodiments, the control circuitry loads (block 256) data from the memory circuitry prior to initiating (block 254) the welding process. As may be appreciated, the data loaded from the memory circuitry may be generated via method 220 of FIG. 7.

Utilizing one or more data sets loaded from the memory circuitry, the control circuitry determines (block 258) the arc length from the functional relationship between λ and $l_{arc}$. In some embodiments, the functional relationship between λ and $l_{arc}$ is a piece-wise function with different functions based on the value. In some embodiments, the functional relationship between λ and $l_{arc}$ is a polynomial function (e.g., third order). Upon determination of arc length from the control circuitry determines (block 260) a difference between the determined arc length from block 258, and the arc length setting from block 252. The control circuitry controls (block 262) the power supply and/or the wire feeder in a closed-loop control to adjust the arc length based at least in part on the arc length difference. For example, the control circuitry may control the power conversion circuitry and/or the wire feeder to adjust one or more of the current waveform (e.g., background current, peak current, peak duration, ramp up rate, ramp down rate), the voltage waveform (e.g., background voltage, peak voltage, peak duration, ramp up rate, ramp down rate), the pulse frequency, the pulse period, the electrode extension, and the wire feed rate, thereby adjusting the arc length of the present pulsed waveform or a subsequent pulse waveform.

The control circuitry determines and controls the arc length in a closed-loop control system. In some embodiments, the control circuitry may perform steps 228, 230, 256, 258, 260, and 262 within a pulse period, thereby enabling the control circuitry to control the arc length of each pulsed waveform supplied to the torch. For example, the control circuitry may monitor the weld current and weld voltage of a first pulse waveform in a series of pulse waveforms, determine the arc length at the beginning of the peak phase of the first pulse waveform, and control the arc length of the first pulse waveform before the end of the first pulse waveform. In some embodiments, the control circuitry may utilize the arc length from the first pulsed waveform (e.g., waveform n) to control the arc length of a subsequent pulsed waveform (e.g., waveform n+1, n+2, n+3, n+ . . . , etc).

In some embodiments, the control circuitry described above enables the arc length to be controlled independently of the electrode extension. Control of the arc length independent of the electrode extension may enable the operator to form welds with a desired arc length in relatively deep joints. In some embodiments, the control circuitry may determine wear on the contact tip of the torch based at least in part on changes to the arc length. For example, a worn contact tip transferring the pulsed waveform to the electrode may partially fuse to the electrode and halt or slow the feed of the electrode toward the workpiece. This partial fusion may change the arc length by one or more droplet diameters (e.g., threshold difference) from a first pulsed waveform to a second pulsed waveform. Additionally, or in the alternative, a worn contact tip may affect the axial location of the contact point, thereby affecting the CPWD. Accordingly, determination of this change in the arc length may indicate a worn contact tip of the torch. The control circuitry may notify the operator (e.g., via an alert signal) of a worn contact tip via the operator interface.

In some embodiments, the control circuitry may determine electrode extension and/or CPWD based at least in part on the determined resistance of the electrode as described above in Equation (5). For example, the control circuitry may determine the electrode extension through a functional relationship (e.g., Ω/mm for a known electrode diameter) between the electrode extension and the electrode resistance. Through comparison of the determined resistance during a first pulsed waveform with subsequent pulsed waveforms, the control circuitry may determine the extent and/or type of wear to the contact tip of the torch. The control circuitry may utilize statistical analysis to compare the determined resistance for multiple pulsed waveforms and make determinations of electrode extension, CPWD, or contact tip wear, or any combination thereof. In some embodiments, the control circuitry may determine penetration of the electrode or weld pool through the workpiece based at least in part on the determined resistance, electrode extension, or CPWD. For example, an increased resistance while maintaining a substantially constant CPWD may indicate the electrode extension is increasing and the weld pool is penetrating the workpiece. Accordingly, the control circuitry may monitor the resistance as an indicator for penetration. In some embodiments, the control circuitry may determine the CPWD based at least in part on a sum of the electrode extension and the arc length.

Figure 9:
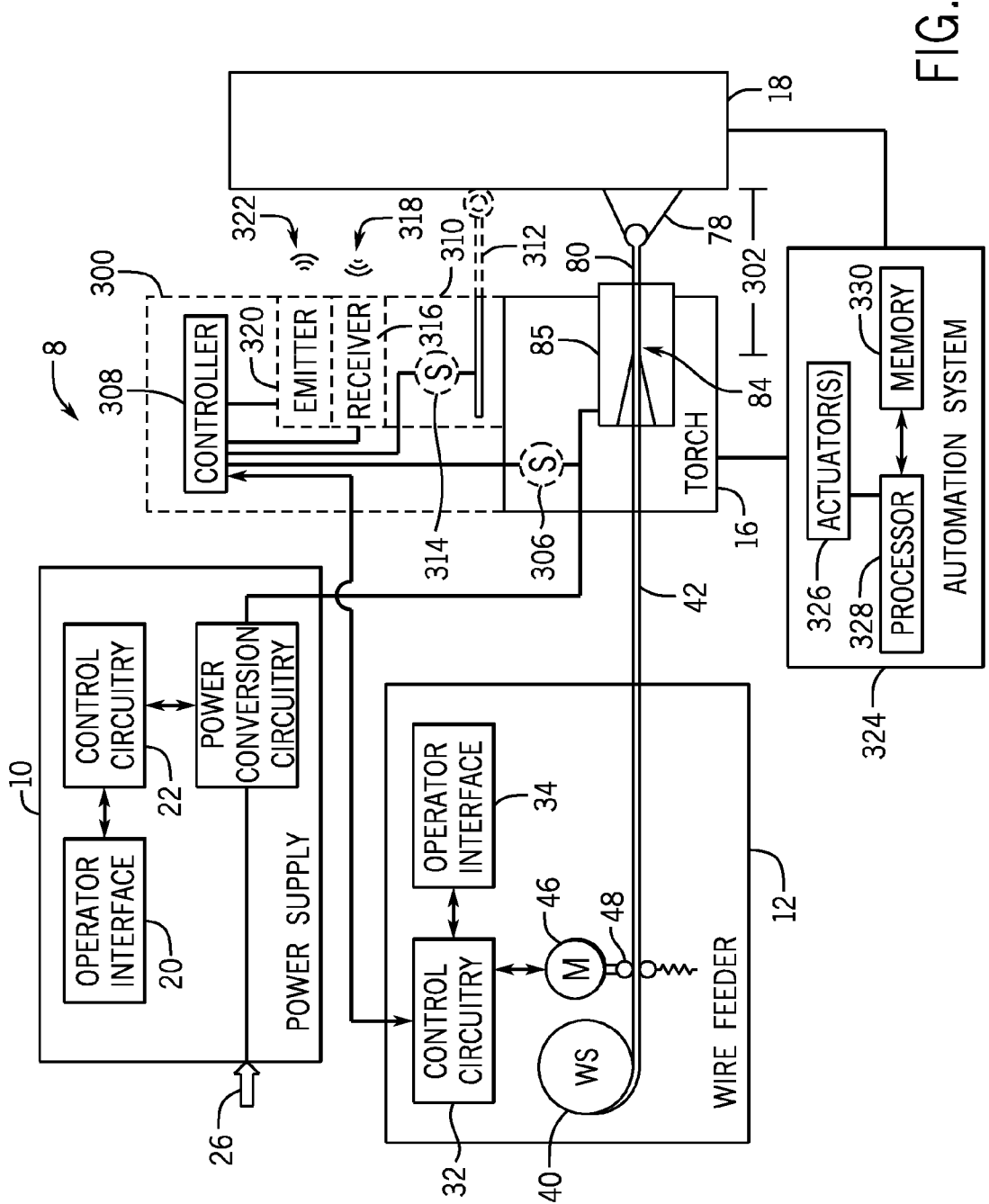
FIG. 9 is a schematic view of an embodiment of a GMAW welding system with a sensing system to determine a contact-point-to-work-distance (CPWD)

As described above and illustrated in FIGS. 1-8, control circuitry of the welding system 8 (e.g., the control circuitry 22 of the power supply 10) may monitor the weld current and the weld voltage for changes (e.g., increases or decreases) to the power supplied during the welding process changes. The control circuitry may determine $l_{arc}$, λ, electrode extension, or CPWD, or any combination thereof through monitoring the welding power supplied to the electrode (e.g., welding wire 42). One or more of the determined electrode parameters (e.g., CPWD, $l_{arc}$, λ, or electrode extension) may be utilized to control the welding system 8. For example, the wire feed speed (WFS) of the welding wire 42 through the torch 16 may be controlled based at least in part on the CPWD. In some embodiments, the WFS may be controlled in order to maintain a desired $l_{arc}$ (e.g., substantially constant $l_{arc}$ value). FIG. 9 illustrates a schematic view of an embodiment of the welding system 8 with a sensing system 300 that determines a CPWD 302 between a contact point 84 of the torch 16 and the workpiece 18. As may be appreciated, the contact point 84 is a location within a contact tip 85 that transfers the welding power supplied by the power supply 10 to the welding wire 42, thereby forming the electrode 80. In some embodiments, a sensor 306 of the sensing system 300 proximate to the contact tip 85 senses the welding current and/or the welding voltage that is applied to the welding wire 42 at the contact point 84. The sensor 306 provides feedback of the sensed welding power to a controller 308 of the sensing system 300. The sensor 306 may include, but is not limited to a voltage sensor, a current sensor, or any combination thereof. The controller 308 may include a memory and a processor. The memory is configured to store data or instructions, and the processor is configured to process the data utilizing the instructions. For example, the controller may utilize the instructions and feedback from the sensing system 300 to determine the CPWD 302 and the $l_{arc}$.

The controller 308 may determine the CPWD 302 based at least in part on the sensed feedback from the sensor 306. The control circuitry 32 of the wire feeder 12 may control the feed motor 46 based at least in part on the CPWD 302 determined by the controller 308, thereby controlling the WFS through the torch 16. While the sensing system 300 is illustrated in FIG. 9 as separate from the power supply 10, the wire feeder 12, and the torch 16, some embodiments of the sensing system 300 may be integral with the power supply 10, the wire feeder 12, or the torch 16. For example, the controller 308 may be a component of the control circuitry 22 of the power supply 10, the controller 308 may be a component of the control circuitry 32 of the wire feeder 12, or the controller 308 may be a component of the torch 16. Accordingly, the controller 308 may perform the method 220 described above and illustrated in FIG. 7. Additionally, or in the alternative, the controller 308 may perform the method 250 described above and illustrated in FIG. 8. That is, the controller 308 of the sensing circuitry 300 may determine one or more of the electrode parameters (e.g., CPWD, $l_{arc}$, λ, or electrode extension) of the welding system 8.

In some embodiments, the sensing system 300 may determine the CPWD 302 via other means. For example, the sensing system 300 may utilize a mechanical system 310 coupled to the torch 16 that interfaces with the torch 16 and the workpiece 18 to measure the CPWD 302. That is, the mechanical system 310 may directly contact the workpiece 18 and the torch 16 to measure the CPWD 302. In some embodiments, the mechanical system 310 mounted in a fixed position relative to the torch 16 may utilize a telescoping member 312 and a sensor 314 (e.g., linear displacement sensor) to measure changes in the position of the torch 16 relative to the workpiece 18. The controller 308 may determine the CPWD 302 from measurements of the mechanical system 310, that is, from feedback of the sensor 314.

Additionally, or in the alternative to the mechanical system 310, the sensing system 300 may determine the CPWD 302 via a non-contact sensing system including, but not limited to, an optical sensing system, an ultrasonic sensing system, or an inductive sensing system, or any combination thereof. For example, a receiver 316 of the sensing system 300 may receive reflected signals 318 off the workpiece 18, and the controller 308 may determine the CPWD 302 utilizing the reflected signals 318. An emitter 320 of the sensing system may emit signals 322 that are at least partially reflected off of the workpiece 18 and received by the receiver 316. The emitter 320 may be an LED that emits light, a radio transmitter that emits radio waves, a microwave transmitter that emits microwaves, an ultrasound transmitter that emits ultrasonic waves, or a coil that emits an electromagnetic field, and the receiver 316 may be any receiver capable of receiving reflected signals (e.g., light waves, radio waves, microwaves, ultrasonic waves, electromagnetic fields, etc.) from such emitters 320. In some embodiments, the receiver 316 may be one or more cameras. The controller 308 may determine the CPWD 302 with feedback from the receiver 316 without the emitter 320.

In some embodiments, an automation system 324 may be coupled to the torch 16 and/or to the workpiece 18. One or more actuators 326 of the automation system 324 are controlled by a processor 328 to move the torch 16 relative to the workpiece 18 during weld formation according to a predetermined set of instructions loaded into a memory 330. An operator may load instructions into the memory 330 of the automation system 324 via the operator interfaces 20, 34.

Figure 10:
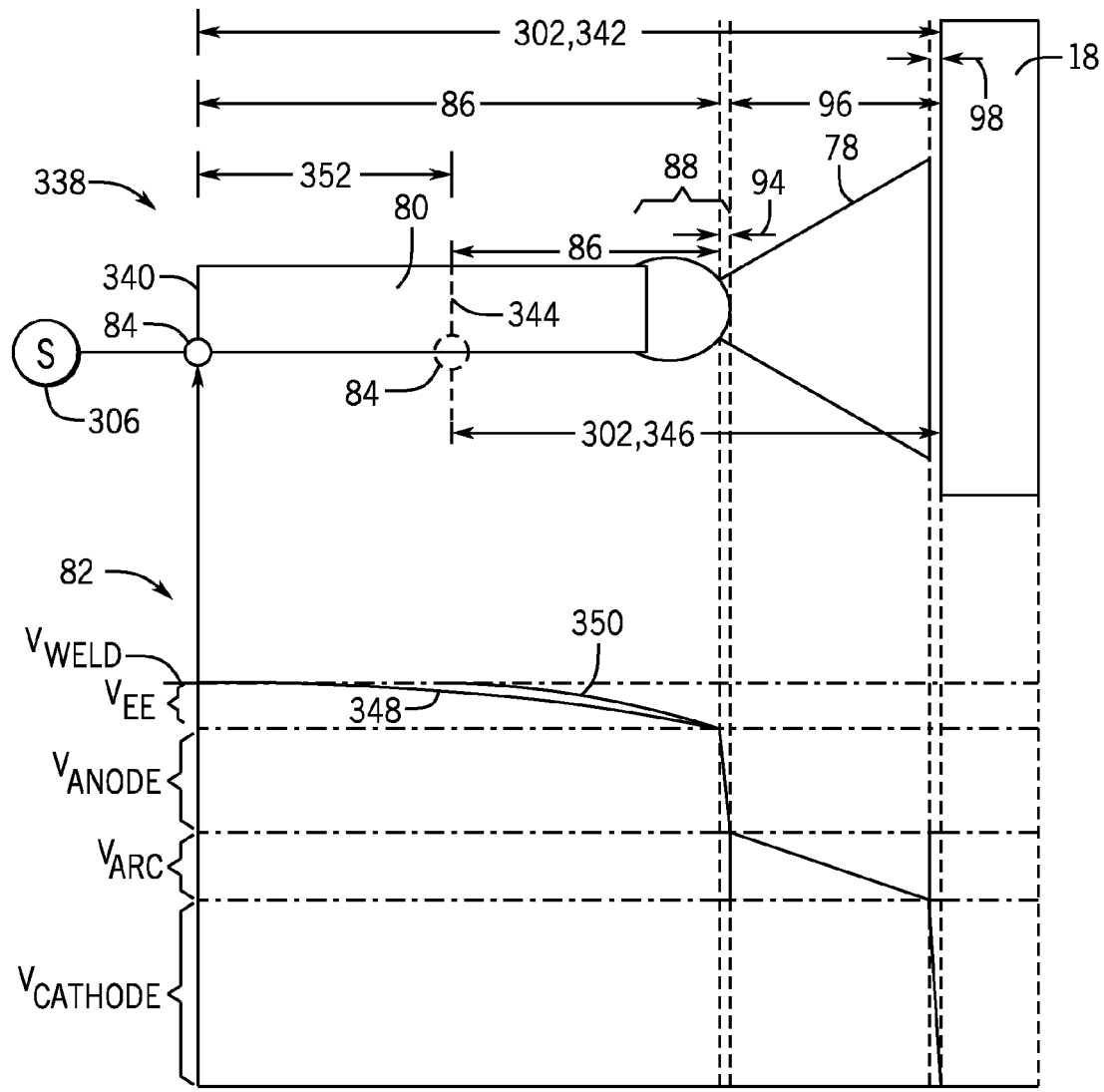
FIG. 10 is an embodiment of an electrode and a welding arc with different electrode extensions.

FIG. 10 illustrates a graph 338 of embodiments of the electrode 80 and the welding arc 78 for different positions of the contact point 84 relative to the workpiece 18. Additionally, the lower graph 82 illustrates components of the weld voltage $V_{weld}$. Accordingly, FIG. 10 illustrates different CPWDs 302 for the different positions of the contact point 84. For example, a first position 340 of the contact point 84, shown by solid lines, has a first CPWD 342, and a second position 344 of the contact point 84 (e.g., closer to the workpiece 18), shown by dashed lines, has a second (e.g., shorter) CPWD 346. As described above with FIG. 3, torch 16 provides the power output (e.g., pulsed waveform) to the electrode 80 via the contact point 84. The contact point 84 may be coupled to the sensor 306 (e.g., voltage sensor, current sensor). The power output provided to the electrode 80 at the contact point 84 is applied with a weld voltage ($V_{weld}$) with respect to the workpiece 18.

A first voltage trace 348 corresponding to the first position 340 of the contact point 84 illustrates the voltage across the first CPWD 342 during a welding operation. A second voltage trace 350 corresponding to the second position 344 of the contact point 84 illustrates the voltage across the second CPWD 346 during a welding operation. The weld voltage ($V_{weld}$) applied to the electrode 80 at the contact point 84 may be substantially the same regardless of the CPWD 302. For example, the wire feeder providing the electrode 80 may be a constant voltage (CV) wire feeder. However, the weld current applied to the electrode 80 at the contact point 84 is based at least in part on the resistance of the electrode 80 and the arc 78. As may be appreciated, increasing the electrode extension 86 increases the resistance of the electrode 80, thereby decreasing the weld current when the weld voltage $V_{weld}$ remains substantially the same. In a similar manner, increasing the arc length 96 may increase the resistance of the arc 78, thereby decreasing the weld current when the weld voltage $V_{weld}$ remains substantially the same. Accordingly, increasing the CPWD 302 may increase the resistance from the contact point 84 to the workpiece 18, thereby decreasing the weld current, and decreasing the CPWD 302 may decrease the resistance from the contact point 84 to the workpiece 18, thereby increasing the weld current. FIG. 10 illustrates embodiments of the torch 16 relative to the workpiece 18 in which the $V_{EE}$, $V_{anode}$, $V_{arc}$, and $V_{cathode}$ are substantially the same despite the difference in electrode extension 86 between the first CPWD 342 and the second CPWD 346.

The total process power of the weld may be based at least in part on the CPWD 302. The total process power, as defined herein, is the weld power applied along the CPWD 302 in the electrode 80, the arc 78, and the workpiece 18. The total process power may be determined from the weld voltage and the weld current applied to the electrode 80 at the contact point 84, which may be sensed by one or more sensors 306 of the sensing system 300 described with respect to FIG. 9. For example, the total process power may be determined by the product of the weld voltage and the weld current applied to the electrode 80 at the contact point 84. As discussed above, when the weld voltage $V_{weld}$ remains substantially the same, changes to the CPWD 302 may affect the resistance from the contact point 84 to the workpiece 18, thereby changing the weld current and the total process power. That is, changes to the CPWD 302 via changing the electrode extension 86 and/or the arc length 96 may be directly related to the resistance across the CPWD 302, and inversely related to the weld current across the CPWD 302. While the weld voltage $V_{weld}$ may be substantially constant for different CPWDs 302, the weld current and total process power may change.

For example, the resistance of the electrode 80 in the first position 340 of the contact point 84 is greater than the resistance of the electrode 80 in the second position 344 of the contact point 84 based at least in part on a difference 352 in the electrode extension 86 between the first position 340 and the second position 344. Accordingly, when $V_{EE}$ across the electrode 80 is approximately the same for each position, the weld current through the electrode 80 and the arc 78 may be greater in the second position 344 than in the first position 340 due to the lower resistance of the electrode 80 in the second position 344. In a similar manner, the resistance across the arc 78 may be proportional to the arc length 96, such that increasing the arc length 96 increases the resistance across the arc 78. Accordingly, when $V_{arc}$ across the arc 78 is approximately the same for different values of CPWD 302, the weld current through the electrode 80 and the arc 78 may be inversely proportional with the resistance.

When the weld voltage $V_{weld}$ applied to the electrode 80 at the contact point 84 is controlled in a constant voltage regulation system (e.g., $V_{weld}$ is maintained at a substantially constant value), changing the CPWD 302 via changes to the electrode extension 86 and/or changes to the arc length 96 may affect the weld current and the total process power. Decreasing the CPWD 302 may increase the weld current and increase the total process power. Conversely, increasing the CPWD 302 may decrease the weld current and decrease the total process power. The wire feeder 12 supplies the welding wire (e.g., electrode 80) to the torch 16 at a base WFS that is based at least in part on a design CPWD value. The welding system 8 is configured such that when the CPWD 302 is approximately equal to the design CPWD value, the weld is formed with a base total process power level. In some embodiments, the base total process power level may be within (e.g., approximately centered within) a total process power range specified in a welding procedure specification (WPS) for the desired weld. Changing the CPWD 302 from the design CPWD value changes the total process power from the base total process power level.

In some situations, it may be desirable at times during weld formation to adjust the total process power within the process power range. For example, reducing the total process power level may reduce penetration into or through the workpiece 18. Additionally, or in the alternative, adjusting the total process power level may accommodate weld formation along a weld path with inconsistent fit-up (e.g., uneven gap width, thin workpiece sections) along the weld path. For example, increasing the total process power level when a gap width decreases may enable increased travel speed, and decreasing the total process power level when the gap width increases may enable decreased travel speed. The total process power level may be decreased when welding thin materials. Furthermore, adjustments to the total process power level during weld formation may facilitate changes in the welding position (e.g., flat to vertical, vertical to overhead, horizontal to vertical, and so forth).

Figure 11:
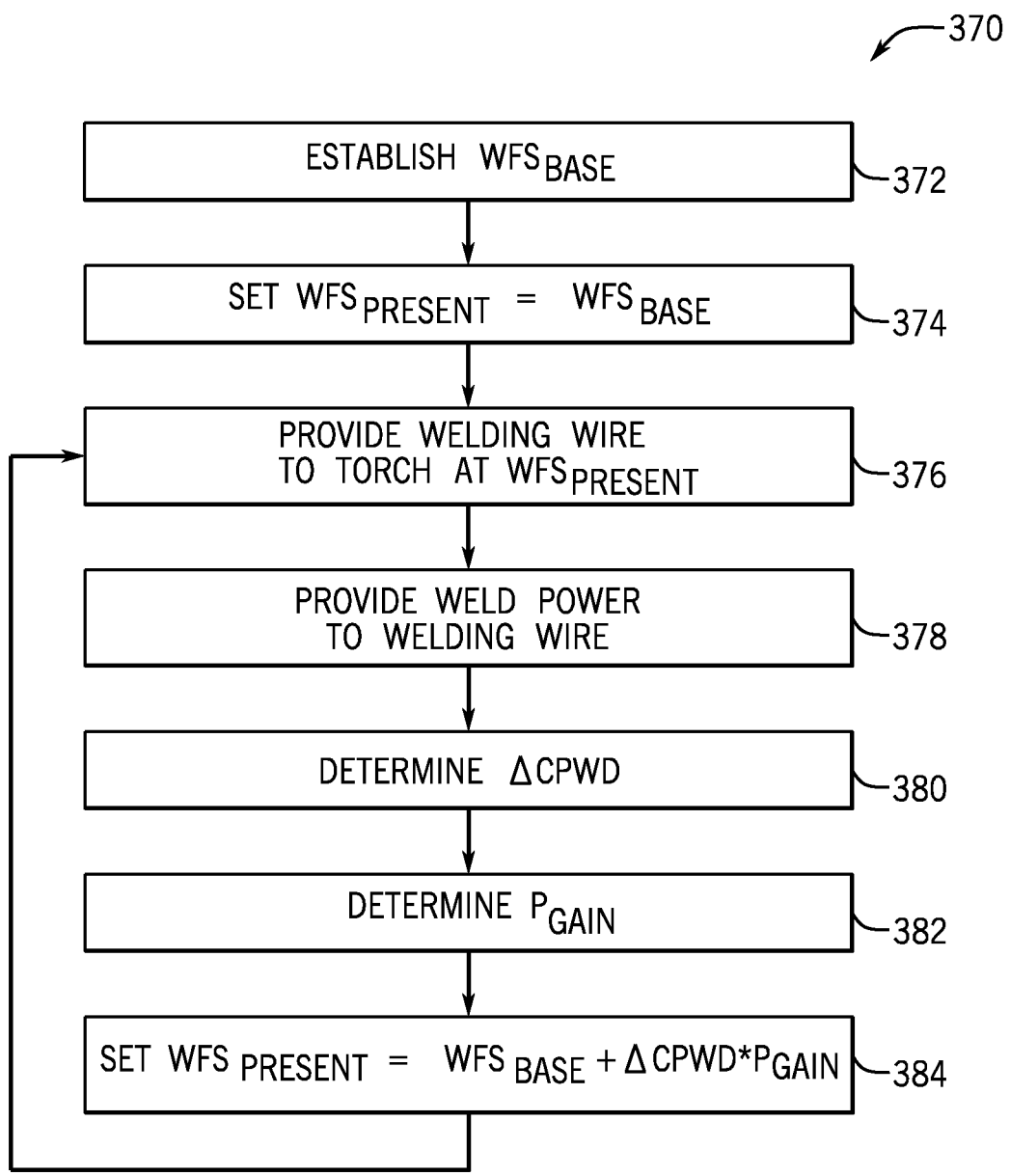
FIG. 11 is a flow chart illustrating a method to control the WFS of a GMAW welding system.

The welding system 8 may affect the degree to which changes to the CPWD 302 affect the total process power. For example, the WFS may be controlled based at least in part on the CPWD 302 to increase or decrease the effects that changes to the CPWD 302 have on the total process power. FIG. 11 illustrates an embodiment of a method 370 of controlling the WFS based at least in part on the CPWD 302. Prior to initiating formation of a weld, the operator and/or the welding system 8 establishes (block 372) the base WFS (e.g., $WFS_{base}$). The base WFS may be loaded from a memory of the welding system based at least in part on weld settings (e.g., weld voltage, weld current) of the welding system 8. Additionally, or in the alternative, the base WFS may be established directly or indirectly from operator input to an operator interface of the power supply 10, the wire feeder 12, or the torch 16. The base WFS may be based at least in part on a design CPWD value to facilitate weld formation with a base total process power level. Upon establishment of the base WFS, a controller (e.g., control circuitry 22, control circuitry 32, and/or controller 308) of the welding system 8 sets (block 374) the present WFS (e.g., $WFS_{present}$) to the base WFS. When the trigger of the torch is actuated, the welding wire feeder 12 provides (block 376) the welding wire to the torch 16 at the present WFS. The weld power is provided (block 378) to the welding wire directly from the power supply 10 or indirectly from the power supply 10 (e.g., via the wire feeder 12). The controller determines (block 380) a CPWD change (e.g., ΔCPWD) from the design CPWD value utilizing the sensing system 300 described above and illustrated in FIG. 9. Factors that may affect the CPWD change may include, but are not limited to, operator skill, workpiece fit-up, contact tip wear, welding position, or any combination thereof.

In some embodiments, the controller determines (block 382) a gain factor (e.g., $P_{gain}$) to be utilized to adjust the WFS. The determined gain factor may be based at least in part on a constant value (e.g., 10 inches per minute for each ΔCPWD of 0.1 inch), a look-up table, a user preference, or a functional relationship (e.g., linear, exponential, logarithmic), or any combination thereof. The gain factor may be loaded from memory and/or received as an operator input via an operator interface. The gain factor may be a positive or negative value, and the gain factor may be based at least in part on the magnitude of the CPWD change. For example, the gain factor may be directly or inversely proportional to the magnitude of the CPWD change. Additionally, or in the alternative, the gain factor may be based at least in part on whether the CPWD change is positive or negative. For example, the gain factor for positive CPWD changes may be different (e.g., greater than or less than) the gain factor for negative CPWD changes. Furthermore, the gain factor may be bound by thresholds of the welding system or a WPS, thereby maintaining the present WFS within a desired range of feed speeds. For example, the gain factor may be limited so that $WFS_{present}$ is a wire feed speed that the wire feeder 12 is configured to provide to the torch 16.

Upon determination of the gain factor $P_{gain}$, the controller sets (block 384) the present WFS to the base WFS adjusted by a product of the CPWD change and the gain factor. Accordingly, the present WFS may be increased or decreased based at least in part on the CPWD change. Where the gain factor is directly proportional to the magnitude of the CPWD change, the gain factor augments the change in the total process power that would occur due to the CPWD change without adjustment to the present WFS. For example, increasing the CPWD by a first distance may reduce the total process power by a first power quantity without adjustment of the present WFS based on the CPWD. Adjusting the present WFS by the product of the gain factor and the CPWD change (e.g., first distance) may reduce the total process power by a second power quantity that is greater than the first power quantity. As another example, decreasing the CPWD by a second distance may increase the total process power by a third power quantity without adjustment of the present WFS based on the CPWD. Adjusting the present WFS by the product of the gain factor and the CPWD change (e.g., second distance) may increase the total process power by a fourth power quantity that is greater than the third power quantity. In some embodiments the controller may increase the present WFS when the CPWD is decreased, and the controller may decrease the present WFS when the CPWD is increased. In some embodiments, the controller may increase the present WFS when the CPWD is increased, and the controller may decrease the present WFS when the CPWD is decreased. Accordingly, the controller may adjust (e.g., increase, decrease) the WFS based at least in part on the CPWD change.

In some embodiments, the gain factor may be inversely proportional to the magnitude of the CPWD change. In some embodiments, the gain factor may be inversely proportional to magnitude of the CPWD change for relatively small CPWD changes, and directly proportional to the magnitude of the CPWD change for relatively large CPWD changes. This relationship between the gain factor and the CPWD may reduce the effect on the total process power of relatively small CPWD changes (e.g., unintended variations by operator due to torch steadiness), and may augment the effect on the total process power of relatively large CPWD changes (e.g., intended variations by operator). The controller may repeat blocks 376 to 384 of the method 370 during weld formation for further adjustments to the present WFS based at least in part on CPWD changes.

FIG. 12 illustrates a chart 398 of the present WFS, the CPWD, and total process power along a weld path 400 when the present WFS 402 is controlled based at least in part on the CPWD 404. The weld path 400 has a first component 406 and a second component 408 of the workpiece 18 to be welded together. The fit-up of the first and second components 406, 408 may have a gap 410 with a gap width 412 that may vary along the weld path 400. During weld formation, the operator may move (e.g., weave) the torch 16 along the weld path 400 as illustrated by arrows 414. In a first section 416 of the weld path 400, the gap width 412 may be substantially uniform. The CPWD 404 may be maintained at a substantially constant value 418 (e.g., design CPWD value) along the first section 416. Accordingly, the WFS 402 may be maintained at a substantially constant value 420. In some embodiments, the WFS 402 may be controlled to the value 420 in sections 422 and 424 when the CPWD 404 is at the corresponding value 418. A trace 421 of the total process power illustrates that the total process power may be maintained at a substantially constant value 423 (e.g., the base total process power level) when the CPWD 404 and the WFS 402 are steady.

The CPWD 404 may change from the design CPWD value during weld formation, such as at a second section 426 and a third section 428 of the weld path 400. In the second section 426, the gap width 412 increases and the CPWD 404 increases to a first CPWD value 430. That is, the contact point 84 is further from the workpiece component 18 during weld formation in the second section 426 than during weld formation in the first section 416. As discussed above, increasing the CPWD 404 without adjusting the WFS 402 may decrease the total process power 421 to a first power level 432. Curve 434 in the second section 426 illustrates a controlled decrease of the WFS 402 based at least in part on the CPWD 404, thereby decreasing the total process power 421 to a second power level 436. The magnitude and rate of change to the WFS 402 is based at least in part on the gain factor. Moreover, the difference between the first power level 432 (e.g., without WFS adjustment) and the second power level 436 (e.g., with WFS adjustment) is based at least in part on the gain factor. Accordingly, the gain factor may be adjusted to enable the WFS 402 shown by the dashed curves 438. Adjustments to the WFS 402 may correspond to adjustments to the total process power 421. Decreasing the WFS 402 when the gap width 412 increases may reduce the heat applied to the workpiece 18, thereby reducing the probability of the weld penetrating through the workpiece 18.

In the third section 428, the gap width 412 decreases and the CPWD 404 decreases to a second CPWD value 439. As discussed above, decreasing the CPWD 404 without adjusting the WFS 402 may increase the total process power 421 to a third power level 440. Curve 442 in the third section 428 illustrates a controlled increase of the WFS 402 based at least in part on the CPWD 404, thereby increasing the total process power 421 to a fourth power level 444. The magnitude and rate of change to the WFS 402 is based at least in part on the gain factor. Moreover, the difference between the third power level 440 (e.g., without WFS adjustment) and the fourth power level 444 (e.g., with WFS adjustment) is based at least in part on the gain factor. The gain factor may be adjusted to enable the WFS 402 shown by the dashed curves 446. Adjustments to the WFS 402 may correspond to adjustments to the total process power 421. Increasing the WFS 402 when the gap width 412 decreases may enable the torch travel speed to increase along the weld path 400.

In a fourth section 448, the CPWD 404 may increase independent of the gap width 412. For example, the operator may move the torch 16 away from the workpiece 18 in the fourth section 448 of the weld path 400, such as to accommodate a change in welding position and/or a change in the thickness of the workpiece 18. As discussed above with respect to the second section 426, the WFS 402 and the total process power 421 are controlled to change based at least in part on the change to the CPWD 402 in the fourth section 448.

In summary, embodiments of the welding system described herein may dynamically control the WFS based at least in part on the CPWD. Control of the WFS based at least in part on the CPWD may increase control of the effect of CPWD on the total process power level. Upon determination of the CPWD, a gain factor is utilized to augment or reduce the effects of the CPWD on the total process power. Accordingly, the WFS may be dynamically controlled during weld formation without manual adjustment of physical controls on the torch or other welding system component. In some embodiments, the WFS may be controlled in order to maintain a desired $l_{arc}$. That is, the $l_{arc}$ may be determined and controlled in conjunction with control of the WFS.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling a welding system comprising:
   receiving an input via an operator interface relating to an operator preference;
   providing a welding wire to a welding torch at a first wire feed speed;
   providing a pulsed power output to the welding wire via a contact point of the welding torch;
   determining, utilizing a sensing system, a contact-point-to-work-distance (CPWD) between the contact point and a workpiece, wherein determining the CPWD comprises determining an arc length based at least in part on the pulsed power output, determining a resistance of a powered portion of the welding wire based at least in part on the pulsed power output, determining an electrode extension based at least in part on a functional relationship between the resistance and the electrode extension, and determining the CPWD based at least in part on the arc length and the electrode extension; and
   changing, utilizing a controller, a wire feed speed of the welding wire to a second wire feed speed during an operator-controlled weld based at least in part on the determined CPWD and the input of the operator preference received via the operator interface.

2. The method of claim 1,
   wherein the arc length comprises a distance between a powered end of the welding wire and the workpiece— and the powered portion comprises a portion of the welding wire between the contact point and the powered end of the welding wire.

3. The method of claim 1, wherein the first wire feed speed is functionally related to the second wire feed speed by a gain factor, and the gain factor is based on the input, a look-up table, a functional relationship, or a wire feed speed range of the welding system, or any combination thereof.

4. The method of claim 3, comprising setting the gain factor, utilizing the operator interface, prior to initiating formation of the weld based at least in part on the operator preference, wherein the operator interface is disposed on the welding torch of the welding system, on a wire feeder of the welding system, or on a power source of the welding system.

5. The method of claim 1, wherein the second wire feed speed is greater than the first wire feed speed when the determined CPWD decreases, and the second wire feed speed is less than the first wire feed speed when the determined CPWD increases.

6. The method of claim 1, comprising controlling penetration of a weld into the workpiece based at least in part on the determined CPWD.

7. The method of claim 1, wherein changing the wire feed speed of the welding wire to the second wire feed speed occurs during formation of a weld without manual adjustment of controls of the welding torch of the welding system, manual adjustment of a wire feeder of the welding system, or manual adjustment of a power source of the welding system.

8. The method of claim 1, wherein the welding system comprises an automated welding system.

9. A method of controlling a welding system comprising:
providing a welding wire to a welding torch at a first wire feed speed;
providing a pulsed power output to the welding wire via a contact point of the welding torch;
determining, utilizing a sensing system, a contact-point-to-work-distance (CPWD) between the contact point and a workpiece, wherein determining the CPWD comprises:
determining an arc length based at least in part on the pulsed power output, wherein the arc length comprises a distance between an end of the welding wire and the workpiece;
determining a resistance of a powered portion of the welding wire based at least in part on the pulsed power output, wherein the powered portion comprises a portion of the welding wire between the contact point and the end of the welding wire;
determining an electrode extension based at least in part on a functional relationship between the resistance and the electrode extension; and
determining the CPWD based at least in part on a sum of the arc length and the electrode extension; and
changing, utilizing a controller, a wire feed speed of the welding wire from the first wire feed speed by a gain factor to a second wire feed speed during an operator-controlled weld based at least in part on the determined CPWD, wherein the gain factor is set based at least in part on an operator preference received via an operator interface of the welding system.

10. The method of claim 9, wherein the second wire feed speed is greater than the first wire feed speed when the determined CPWD decreases, and the second wire feed speed is less than the first wire feed speed when the determined CPWD increases.

11. The method of claim 9, comprising controlling the CPWD based at least in part on a gap condition of the workpiece, a welding position of the welding torch, or any combination thereof.

12. The method of claim 9, comprising setting the gain factor prior to initiating formation of a weld based at least in part on the operator preference, wherein the gain factor is set via the operator interface of a power source or a wire feeder of the welding system.

13. The method of claim 9, wherein changing the wire feed speed of the welding wire occurs during formation of a weld without manual adjustment of a user control disposed on a welding power source of the welding system, on a wire feeder of the welding system, or on the welding torch of the welding system.

14. A welding system comprising:
an operator interface configured to receive an input relating to an operator preference;
a wire feeder coupled to a torch and configured to provide a welding wire to the torch, wherein the torch comprises a contact tip with a contact point;
a sensing system configured to determine a contact-point-to-work-distance (CPWD) between the contact point of the torch and a workpiece, wherein the sensing system is configured to determine a resistance of the welding wire within the torch based at least in part on changes to a current and a voltage of a welding waveform, the sensing system is configured to determine an arc length and an electrode extension based at least in part on a functional relationship between the resistance and the electrode extension, and the sensing system is configured to determine the CPWD based at least in part on the arc length and the electrode extension; and
a controller coupled to the wire feeder, wherein the controller is configured to control a wire feed speed (WFS) of the wire feeder during an operator-controlled weld based at least in part on the determined CPWD and the input of the operator preference received via the operator interface.

15. The welding system of claim 14, wherein the sensing system comprises one or more sensors configured to sense the welding waveform applied to the welding wire at the contact point, and the sensing system is configured to determine the CPWD based at least in part on changes to the welding waveform applied to the welding wire at the contact point.

16. The welding system of claim 14, wherein the welding system comprises an automated welding system, the controller is configured to control a movement of the torch relative to the workpiece, and the controller is configured to control a penetration of a weld into the workpiece based at least in part on the determined CPWD.

17. The welding system of claim 14, wherein the controller is configured to change the wire feed speed based at least in part on a gain factor entered as the input received via the operator interface.

18. The method of claim 1, comprising determining an arc length based at least in part on a functional relationship stored in a memory between the arc length and a voltage across an anode of a weld performed by the welding system, a voltage across a cathode of the weld performed by the welding system, and a voltage across an arc of the weld performed by the welding system.

19. The method of claim 1, comprising determining the arc length based at least in part on previous measurements of arc length and the pulsed power output during a previous calibration weld.

20. The method of claim 1, comprising determining CPWD based at least in part on sensed changes in a position of the welding torch relative to the workpiece via feedback from a displacement sensor, an optical sensor, an ultrasonic sensor, an inductive sensor, or any combination thereof.

* * * * *